United States Patent
Yoshikawa

(10) Patent No.: US 12,373,526 B2
(45) Date of Patent: Jul. 29, 2025

(54) AUTHENTICATION DEVICE, AUTHENTICATION METHOD, AND INFORMATION PROCESSING DEVICE

(71) Applicant: SONY GROUP CORPORATION, Tokyo (JP)

(72) Inventor: Kiyoshi Yoshikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 148 days.

(21) Appl. No.: 17/753,439

(22) PCT Filed: Aug. 28, 2020

(86) PCT No.: PCT/JP2020/032558
§ 371 (c)(1),
(2) Date: Mar. 3, 2022

(87) PCT Pub. No.: WO2021/049321
PCT Pub. Date: Mar. 18, 2021

(65) Prior Publication Data
US 2022/0318357 A1    Oct. 6, 2022

(30) Foreign Application Priority Data
Sep. 12, 2019   (JP) .................. 2019-165866

(51) Int. Cl.
*G06F 21/32*       (2013.01)
*G06F 18/21*       (2023.01)
*G06F 18/22*       (2023.01)

(52) U.S. Cl.
CPC .......... *G06F 21/32* (2013.01); *G06F 18/2163* (2023.01); *G06F 18/22* (2023.01)

(58) Field of Classification Search
None
See application file for complete search history.

(56) References Cited

U.S. PATENT DOCUMENTS 10,579,863 B2 *   3/2020   Volkart .................. G05D 1/686
11,303,631 B1 *   4/2022   Alexanian ............... G06F 21/45
(Continued)

FOREIGN PATENT DOCUMENTS

CN    101174949 A    5/2008
CN    101504784 A    8/2009
(Continued)

OTHER PUBLICATIONS

International Search Report and Written Opinion of PCT Application No. PCT/JP2020/032558, issued on Nov. 24, 2020, 10 pages of ISRWO.

Primary Examiner — Christopher B Robinson
(74) Attorney, Agent, or Firm — CHIP LAW GROUP

(57) ABSTRACT

The present technology relates to an authentication device, an authentication method, a program, and an information processing device capable of performing user authentication using biometric information without storing the biometric information.

The authentication device performs user authentication by comparing answer information that is generated by converting authentication information generated by converting basic information using biometric information for generation using biometric information for authentication with correct answer information. The present technology is applied to, for example, an authentication device that performs biometric authentication.

19 Claims, 20 Drawing Sheets

(56) References Cited

U.S. PATENT DOCUMENTS

| | | | |
|---|---|---|---|
| 2005/0204149 A1 | 9/2005 | Watanabe | |
| 2008/0211627 A1* | 9/2008 | Shinzaki | G06V 40/67 |
| | | | 340/5.82 |
| 2009/0222421 A1* | 9/2009 | Aoki | G06F 21/32 |
| 2012/0013437 A1* | 1/2012 | Yokoi | G06V 40/12 |
| | | | 340/5.82 |
| 2013/0318351 A1* | 11/2013 | Hirano | H04L 9/3231 |
| | | | 713/168 |
| 2015/0312041 A1 | 10/2015 | Choi | |
| 2016/0072801 A1 | 3/2016 | Cao et al. | |
| 2017/0005794 A1 | 1/2017 | Paddon et al. | |
| 2017/0115794 A1 | 4/2017 | Carteri | |
| 2020/0380114 A1* | 12/2020 | Kursun | G06N 3/08 |

FOREIGN PATENT DOCUMENTS

| | | | | |
|---|---|---|---|---|
| CN | 101631023 A | | 1/2010 | |
| CN | 101751710 A | | 6/2010 | |
| CN | 103380591 A | | 10/2013 | |
| CN | 105471575 A | | 4/2016 | |
| CN | 106030668 A | | 10/2016 | |
| CN | 106330464 A | | 1/2017 | |
| CN | 106888204 A | | 6/2017 | |
| CN | 107004077 A | | 8/2017 | |
| CN | 107852325 A | | 3/2018 | |
| CN | 109344593 A | | 2/2019 | |
| CN | 109791583 A | | 5/2019 | |
| CN | 110169014 A | | 8/2019 | |
| JP | 2006158851 A | * | 6/2006 | |
| JP | 2006-195912 A | | 7/2006 | |
| JP | 2009020690 A | | 1/2009 | |
| JP | 2011-060256 A | | 3/2011 | |
| JP | 2013-123142 A | | 6/2013 | |
| JP | 2013120540 A | * | 6/2013 | |
| JP | 2013120580 A | * | 6/2013 | ......... G06K 9/00006 |
| JP | 5287161 B2 | * | 9/2013 | |
| JP | 2013540321 A | | 10/2013 | |
| JP | 2014-067175 A | | 4/2014 | |
| JP | 2014085913 A | * | 5/2014 | |
| JP | 2016116203 A | | 6/2016 | |
| JP | 2017-528070 A | | 9/2017 | |
| KR | 10-2017-0051424 A | | 5/2017 | |
| KR | 20190085731 A | * | 7/2019 | |
| WO | WO-2017000829 A1 | | 1/2017 | |
| WO | 2017/030630 A1 | | 2/2017 | |
| WO | 2017/030631 A1 | | 2/2017 | |

\* cited by examiner

*FIG. 3*

- FINGERPRINT, PALM PRINT
- FINGER VEIN
- FACE
- IRIS
- VOICE
- EAR SOUND

FIG. 5

| [CONVERSION RULE] | |
|---|---|
| <ABOUT RELATIONSHIP BETWEEN REGION AND FEATURE AMOUNT> | <ABOUT CONVERSION METHOD> |
| [x1, y1, x2, y2] REGION USES WIDTH OF VALLEY LINE | IN A CASE WHERE WIDTH OF VALLEY LINE IS EQUAL TO OR LESS THAN 0.1 mm, ... |
| [x3, y3, x4, y4] REGION USES PORTION OF VALLEY LINE OF WHICH CURVATURE IS 90 R | IN A CASE WHERE THE NUMBER OF PORTIONS OF VALLEY LINE OF WHICH CURVATURE IS 90 R IS EQUAL TO OR LESS THAN FIVE, ... |

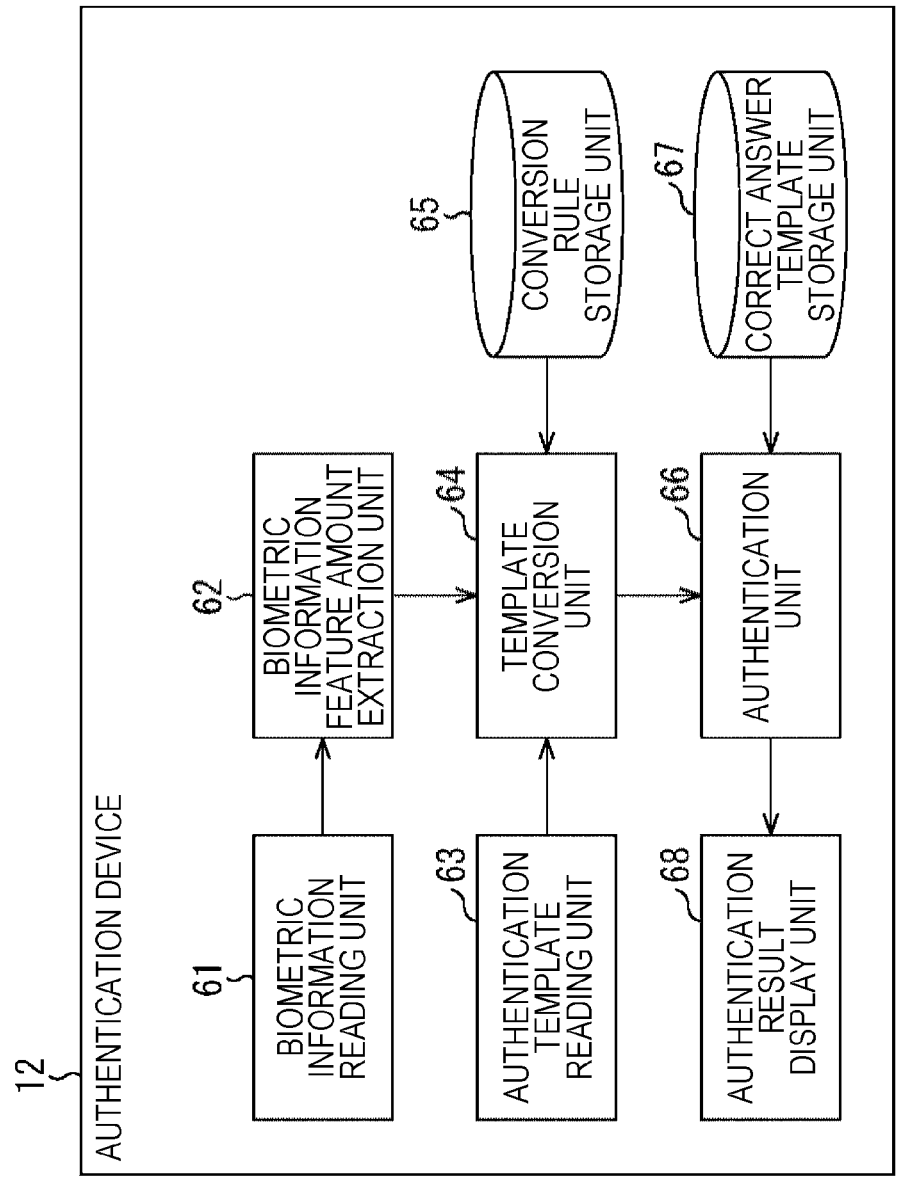

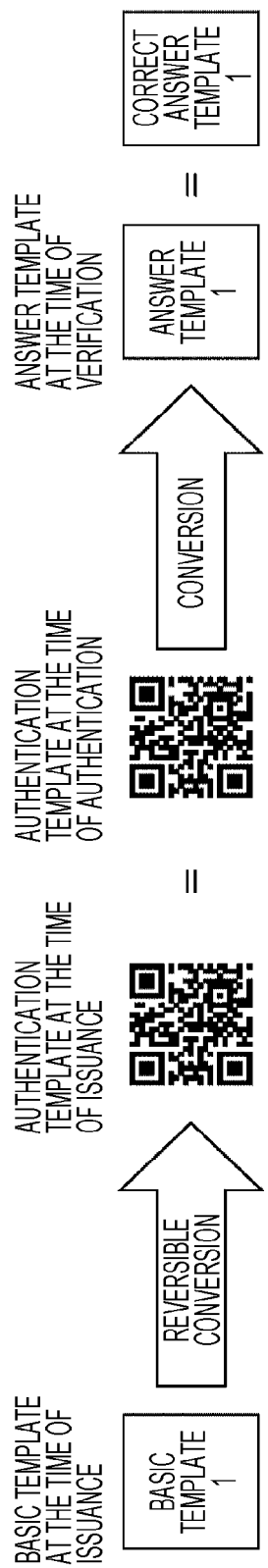
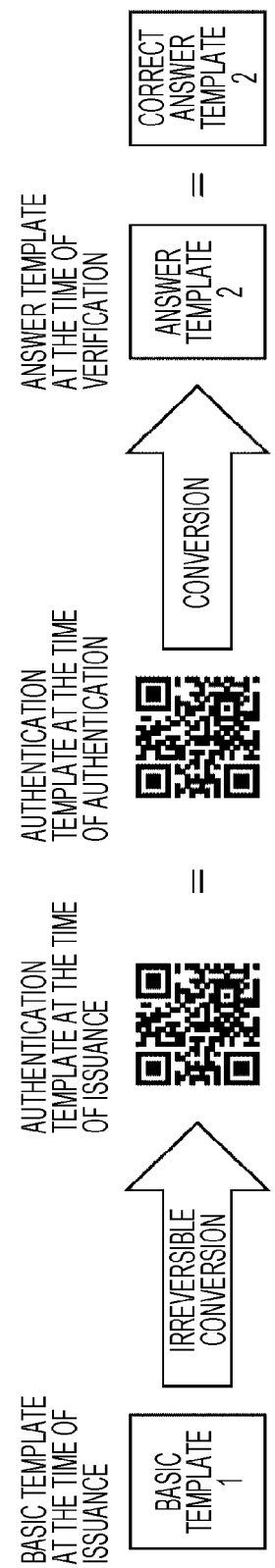
FIG. 8A
FIG. 8B

AUTHENTICATION DEVICE, AUTHENTICATION METHOD, AND INFORMATION PROCESSING DEVICE

CROSS REFERENCE TO RELATED APPLICATIONS

This application is a U.S. National Phase of International Patent Application No. PCT/JP2020/032558 filed on Aug. 28, 2020, which claims priority benefit of Japanese Patent Application No. JP 2019-165866 filed in the Japan Patent Office on Sep. 12, 2019. Each of the above-referenced applications is hereby incorporated herein by reference in its entirety.

TECHNICAL FIELD

The present technology relates to an authentication device, an authentication method, a program, and an information processing device, and more particularly, to an authentication device, an authentication method, a program, and an information processing device that can perform user authentication using biometric information without storing the biometric information.

BACKGROUND ART

In recent years, as a technique for realizing user authentication with high convenience and impersonation resistance, biometric authentication has attracted attention. The biometric authentication is a technique for performing user authentication using biometric information of a person such as a fingerprint or an iris.

For example, Patent Document 1 describes a technique for incorporating biometric information into a secret key and a public key and performing a signature. The technique described in Patent Document 1 distributes the public key generated on the basis of a feature amount of the biometric information and verifies the signature.

On the other hand, typically, in a case where user authentication is performed using the biometric information without using the secret key and the public key, the user authentication is performed by collating biometric information stored in a server or the like with biometric information read from a user.

CITATION LIST

Patent Document

Patent Document 1: Japanese Patent Application Laid-Open No. 2013-123142

SUMMARY OF THE INVENTION

Problems to be Solved by the Invention

However, in a case where the biometric information is stored in the server or the like, there is a risk of leakage of the biometric information that is user's personal information, and it is necessary to take security measures to prevent the leakage.

The present technology has been made in consideration of such a situation, and the present technology can perform user authentication using biometric information without storing the biometric information.

Solutions to Problems

An authentication device according to a first aspect of the present technology includes an authentication unit that performs user authentication by comparing answer information that is generated by converting authentication information generated by converting basic information using biometric information for generation using biometric information for authentication with correct answer information.

An information processing device according to a second aspect of the present technology includes a reading unit that reads biometric information for generation and a conversion unit that converts basic information into authentication information using the biometric information for generation.

In the first aspect of the present technology, the user authentication is performed by comparing the answer information that is generated by converting the authentication information generated by converting the basic information using the biometric information for generation using biometric information for authentication with the correct answer information.

In the second aspect of the present technology, the biometric information for generation is read, and the basic information is converted into the authentication information using the biometric information for generation.

BRIEF DESCRIPTION OF DRAWINGS

FIG. 3 is a diagram illustrating an example of biometric information used in the authentication system.

FIG. 5 is a diagram illustrating an example of a conversion rule.

FIG. 7 is a diagram illustrating an exemplary configuration of an authentication device.

FIGS. 8A and 8B are diagrams illustrating an example of an answer template at the time of authentication.

MODE FOR CARRYING OUT THE INVENTION

Hereinafter, modes for carrying out the present technology will be described. The description will be made in the following order.
1. Outline of Authentication System
2. Exemplary Configuration of Each Device
3. Operation of Each Device
4. Second Embodiment
5. Third Embodiment
6. Fourth Embodiment
7. Modification
8. Exemplary Configuration of Computer

1. Outline of Authentication System

First, an outline of an authentication system to which the present technology is applied will be described.

The authentication system to which the present technology is applied is used, for example, for an event held by gathering a large number of people in a stadium or a hall. In such an event, generally, a user purchases a ticket, presents the ticket, and then, enters an event venue.

When the user enters the event venue, there is a case where user authentication is performed to confirm that a purchaser of the ticket is the same as a visitor who presents the ticket and is about to enter the event venue. An authentication system to which the present technology is applied is used to perform user authentication for confirming whether or not the purchaser of the ticket is the same as the visitor using biometric information.

Figure 1:
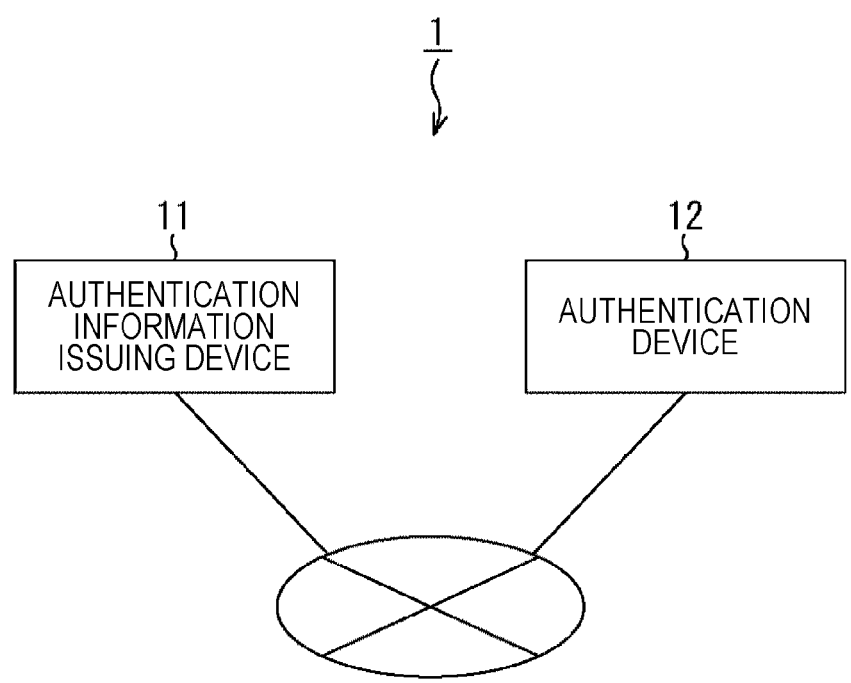
FIG. 1 is a diagram illustrating an exemplary configuration of an authentication system.

FIG. 1 is a diagram illustrating an exemplary configuration of the authentication system.

An authentication system 1 in FIG. 1 includes an authentication information issuing device 11 and an authentication device 12. The authentication information issuing device 11 and the authentication device 12 are connected to each other via a network such as the Internet or a local area network (LAN).

The authentication information issuing device 11 is an information processing device that issues a ticket. A user can purchase a ticket by operating the authentication information issuing device 11. The authentication information issuing device 11 is installed in a store such as a convenience store.

On the other hand, the authentication device 12 is a device that performs user authentication for confirming that a purchaser of a ticket is the same as a visitor. The authentication device 12 is installed in an entrance of an event venue or the like.

In the authentication information issuing device 11 and the authentication device 12, sensors that read user's biometric information are provided. User authentication is performed using the biometric information read by the sensors.

Figure 2:
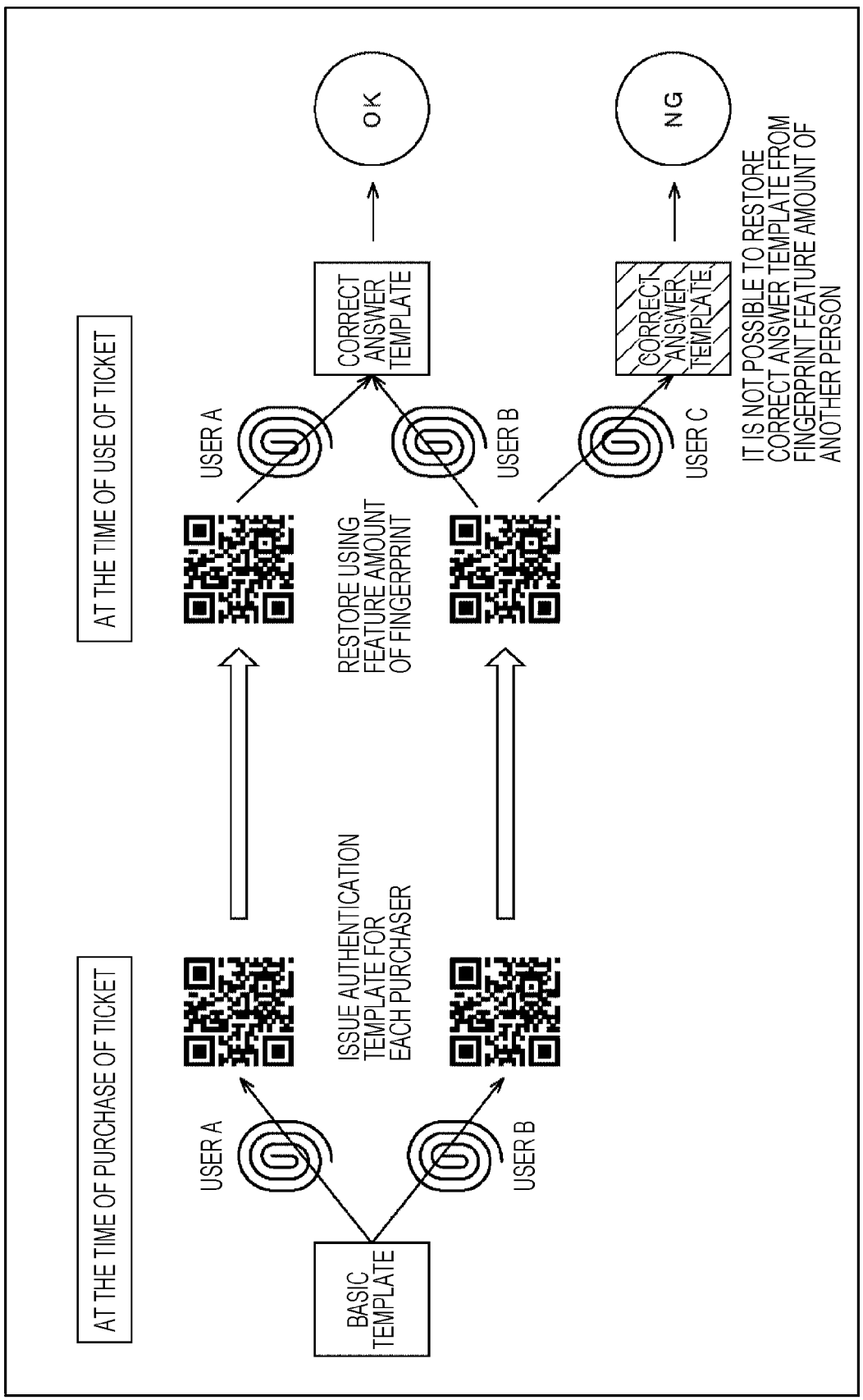
FIG. 2 is a diagram illustrating a flow of processing at the time of purchase and at the time of use of a ticket.

FIG. 2 is a diagram illustrating a flow of processing at the time of purchase and use of the ticket.

The processing illustrated in the left side of FIG. 2 represents the processing at the time of the purchase of the ticket, and the processing illustrated in the right side represents the processing at the time of the use of the ticket. The processing illustrated in the left side is processing executed by the authentication information issuing device 11, and the processing illustrated in the right side is processing executed by the authentication device 12.

A service provider side that manages an event needs to prepare, in advance, a basic template that is one type of basic information and a correct answer template that is one type of correct answer information. The basic information is information used to generate authentication information used for user authentication. The basic template represents the basic information using an image and is used to generate an authentication template that is one type of the authentication information at the time of purchase of a ticket. The correct answer information is information, paired with the basic information, used to verify validity of the authentication information. The correct answer template represents the correct answer information using an image and is used to verify validity of the authentication template at the time of use of a ticket. The authentication information is information generated from the basic information using the user's biometric information, is provided to a user, and is used for user authentication. The authentication template represents the authentication information using an image, is generated from the basic template using the user's biometric information, is provided to a user by being printed on a ticket or the like, and used for user authentication.

The basic template is prepared in the authentication information issuing device 11 in advance. Furthermore, the correct answer template is prepared in the authentication device 12 in advance. The basic template and the correct answer template can be the same information or can be different pieces of information. Hereinafter, a case will be mainly described where the basic template and the correct answer template are the same information.

As illustrated in the left side of FIG. 2, a user makes the authentication information issuing device 11 read a fingerprint that is the biometric information at the time of purchasing a ticket. A spiral illustrated in FIG. 2 represents a fingerprint of a user. An operation such as selection of an event or payment of a fee is performed at the time of the purchase of the ticket.

The authentication information issuing device 11 extracts a feature amount of the read fingerprint and converts the basic template on the basis of the extracted feature amount so as to issue an authentication template. Because the authentication template is information generated on the basis of the feature amount of the fingerprint, the authentication template is information that differs for each purchaser (user).

For example, as the authentication template, a two-dimensional code different for each purchaser is issued. In the example in FIG. 2, two-dimensional codes different for respective users A and B who are the purchasers of the tickets are issued.

The authentication information issuing device 11 provides the authentication template to a user by printing the authentication template on a paper ticket or the like. The user receives the ticket on which the authentication template is printed and brings the ticket at the time of using the ticket.

As illustrated in the right side in FIG. 2, at the time of using the ticket, the user makes the authentication device 12 read the authentication template printed on the ticket and the fingerprint.

The authentication device 12 extracts a feature amount of the read fingerprint and converts the authentication template on the basis of the feature amount so as to restore the correct answer template. The correct answer template is restored by inverse conversion corresponding to the conversion at the time of the issuance of the authentication template.

In a case where the fingerprint read by the authentication device 12 is the same as the fingerprint used when the ticket is purchased, this indicates that the correct answer template is restored from the authentication template. In a case where the correct answer template is restored, the authentication device 12 presents information indicating that the purchaser of the ticket is consistent with the visitor.

The user who has received such presentation is permitted to enter the event venue as a user who has been successfully authenticated.

On the other hand, in a case where the fingerprint read by the authentication device 12 is different from the fingerprint used at the time of the purchase of the ticket, this indicates that it is not possible to restore the correct answer template from the authentication template. In a case where it is not possible to restore the correct answer template, the authentication device 12 presents information indicating that the purchaser of the ticket is not consistent with the visitor.

The user who has received such presentation is prohibited to enter the event venue as a user who has failed the user authentication.

In the example in FIG. 2, in a case where a fingerprint of the user A is read in user authentication based on the two-dimensional code issued by using the fingerprint of the user A, a correct answer template is correctly restored. Furthermore, in a case where a fingerprint of the user B is read in user authentication based on the two-dimensional code issued by using the fingerprint of the user B, a correct answer template is correctly restored. Therefore, the user authentication succeeds.

On the other hand, in a case where a fingerprint of a user C is read in the user authentication based on the two-dimensional code issued by using the fingerprint of the user B, the correct answer template is not correctly restored. Therefore, the user authentication of the user C fails.

As described above, in the authentication system 1, the biometric information used for the user authentication is not saved and is used only when the correct answer template or the authentication template is converted. Therefore, the user can be authenticated using the biometric information without incurring a biometric information leakage risk.

Furthermore, the service provider side can perform the user authentication using the biometric information without requiring costs for managing, saving, and discarding the biometric information.

Moreover, because unique information is used for each living body, a user can enjoy security strength similar to a physical key without troubles of taking a key and any risk of losing the key.

Note that not only the fingerprints but also various types of biometric information may be used for the user authentication above.

FIG. 3 is a diagram illustrating an example of the biometric information used in the authentication system 1.

As illustrated in FIG. 3, in addition to fingerprints, biometric information such as a palm print, a finger vein, a face, an iris, voice, or ear sound may be used.

These pieces of biometric information may be used alone or may be multimodally used in order to improve accuracy. The type of the biometric information can be changed according to a use case.

Furthermore, the authentication information issuing device 11 and the authentication device 12 have a function for checking whether or not the read biometric information has sufficient quality so that a feature amount can be extracted.

2. Exemplary Configuration of Each Device

Configuration of Authentication Information Issuing Device 11

Figure 4:
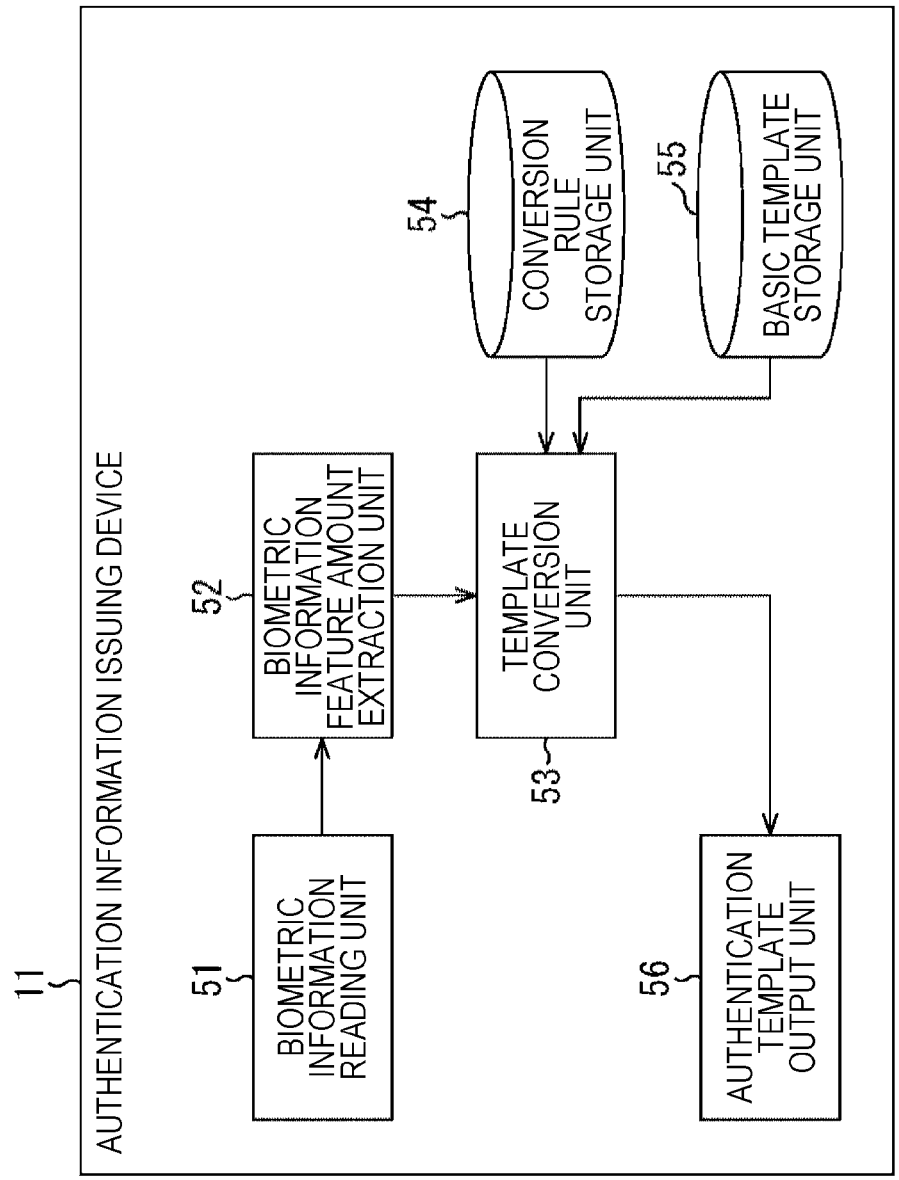
FIG. 4 is a diagram illustrating an exemplary configuration of an authentication information issuing device.

FIG. 4 is a diagram illustrating an exemplary configuration of the authentication information issuing device 11. At least some of functional units illustrated in FIG. 4 are implemented by executing a predetermined program by a central processing unit (CPU) of a computer included in the authentication information issuing device 11.

As illustrated in FIG. 4, the authentication information issuing device 11 includes a biometric information reading unit 51, a biometric information feature amount extraction unit 52, a template conversion unit 53, a conversion rule storage unit 54, a basic template storage unit 55, and an authentication template output unit 56.

The biometric information reading unit 51 includes a sensor that reads various types of biometric information described above. The biometric information reading unit 51 reads user's biometric information and checks quality.

In a case where the quality of the biometric information is not sufficient, the biometric information reading unit 51 reads the biometric information again. On the other hand, in a case where the quality of the biometric information is sufficient, the biometric information reading unit 51 outputs the read biometric information to the biometric information feature amount extraction unit 52 as biometric information for generation.

The biometric information feature amount extraction unit 52 extracts a feature amount from the biometric information for generation supplied from the biometric information reading unit 51.

As the feature amount of the biometric information, a feature amount sufficient to convert the basic template by the template conversion unit 53 in the subsequent stage is required. For example, a necessary feature amount is set according to the basic template. Then, in a case where the set feature amount is extracted, it is determined that the sufficient feature amount is extracted.

Note that, in a case where it is not possible to extract a sufficient feature amount from a single piece of biometric information, the feature amount may be extracted from a plurality of pieces of biometric information.

In a case where the sufficient feature amount can be extracted, the biometric information feature amount extraction unit 52 outputs the feature amount extracted from the biometric information to the template conversion unit 53.

The template conversion unit 53 converts the basic template into the authentication template using the feature amount supplied from the biometric information feature amount extraction unit 52. The basic template is stored in the basic template storage unit 55 in advance and is acquired by the template conversion unit 53.

A method for converting the basic template is stored in the conversion rule storage unit 54 in advance as a conversion rule.

FIG. 5 is a diagram illustrating an example of the conversion rule.

The basic template is converted, for example, in region units obtained by dividing the entire basic template into a plurality of regions. Then, as illustrated in FIG. 5, the type of the feature amount used for conversion of each region of the basic template and the method for converting each region are set as the conversion rules.

In the example in FIG. 5, as a first conversion rule, to use a width of a valley line of a fingerprint in order to convert a [x1, y1, x2, y2] region of the basic template is set. Here, the [x1, y1, x2, y2] region is defined as a rectangular region of which coordinates [x1, y1] and [x2, y2] are set as diagonal vertices. For the conversion of the [x1, y1, x2, y2] region, a conversion method in a case where the width of the valley line is equal to or less than 0.1 mm or the like is set.

Furthermore, as a second conversion rule, the number of portions of valley lines of which a curvature is 90 R is set to be used to convert a [x3, y3, x4, y4] region of the basic template. For the conversion of the [x3, y3, x4, y4] region, a conversion method in a case where the number of portions of the valley lines of which the curvature is 90 R is equal to or less than five or the like is set.

As described above, the template conversion unit 53 performs conversion according to the conversion rules set by associating each region of the basic template with the type of the feature amount and the conversion method.

Figure 6:
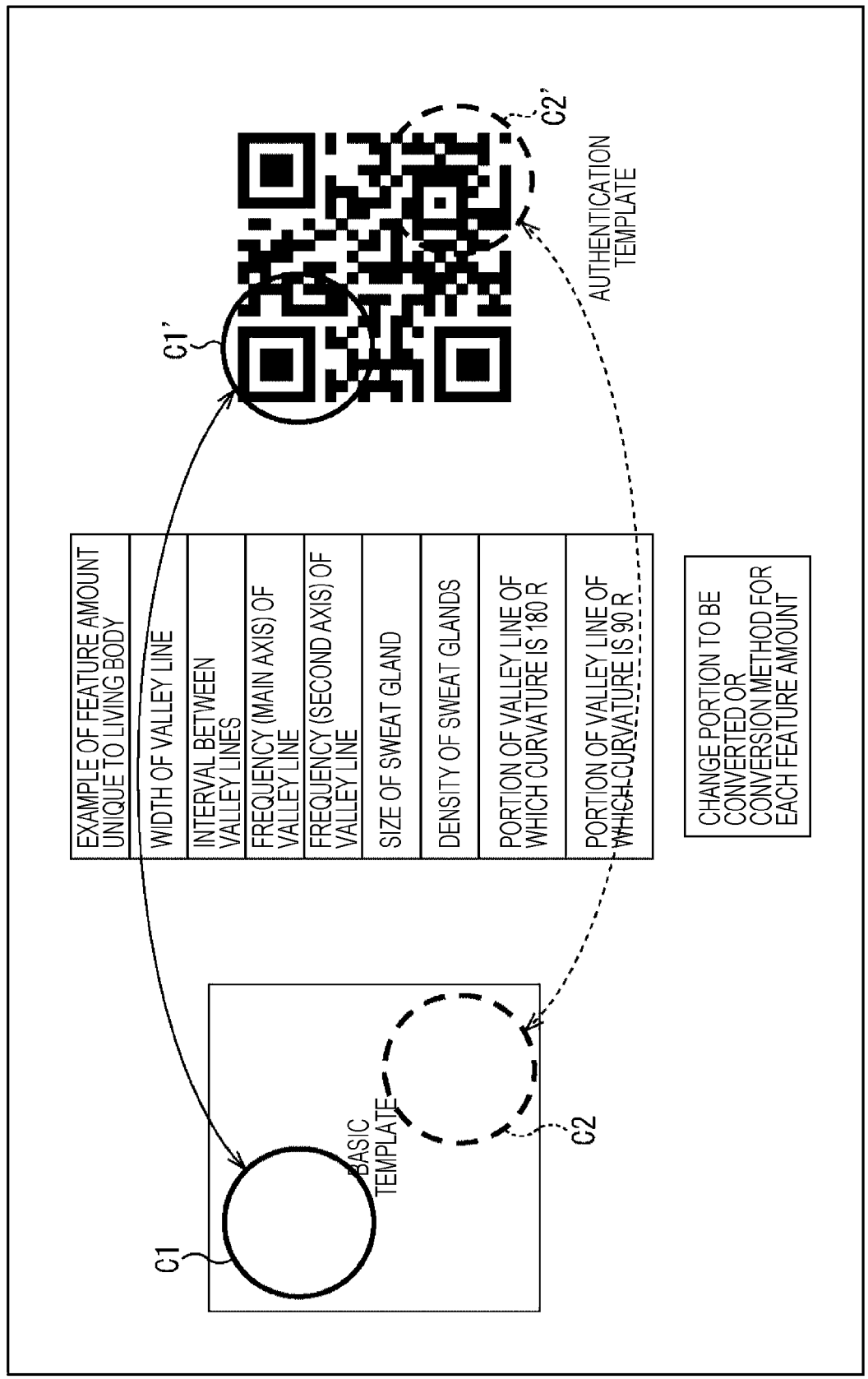
FIG. 6 is a diagram illustrating an example of conversion of a template.

FIG. 6 is a diagram illustrating an example of conversion of a template.

As illustrated in the center of FIG. 6, as the feature amount of the fingerprint that is the biometric information, for example, it is assumed that a width of a valley line, an interval between valley lines, a frequency of a valley line (main axis), a frequency of a valley line (second axis), a size of a sweat gland, density of sweat glands, a portion of a valley line of which a curvature is 180 R, and a portion of a valley line of which a curvature is 90 R be extracted by the biometric information feature amount extraction unit 52.

In this case, the template conversion unit 53 divides the basic template into the plurality of regions and performs conversion for each region according to the conversion rules described with reference to FIG. 5. Furthermore, the conversion is performed wile changing the region of the basic template to be a target and the conversion method for each feature amount.

For example, a rectangular region in the basic template included in a circle C1 in the left side of FIG. 6 ([x1, y1, x2, y2] region) is converted into a rectangular region that is included in a circle C1' included in the authentication template on the basis of the valley line width of the feature amount of the fingerprint.

Furthermore, a rectangular region ([x3, y3, x4, y4] region) in the basic template included in a dashed circle C2 in the left side of FIG. 6 is converted into a rectangular region included in a circle C2' included in the authentication template on the basis of a portion of a valley line of which a curvature is 90 R of the feature amount of the fingerprint.

In this way, after an image of the basic template is converted into binary data, for example, the data is converted into a two-dimensional code as an authentication template. To convert the image of the basic template into binary data, for example, base 64 is used. The authentication template generated by the template conversion unit 53 is output to the authentication template output unit 56 in FIG. 4.

The authentication template output unit 56 prints the authentication template supplied from the template conversion unit 53 on a ticket and outputs the ticket. The authentication template may be output as an image file and transmitted to a mobile terminal such as a smartphone used by a user.

Note that, even in a case where the authentication template is stolen, it is difficult to decrypt the biometric information from the authentication template. Therefore, a risk of leakage of the biometric information is extremely small for the user.

Furthermore, the authentication template may be printed on the ticket using ink that can be read only at a special wavelength that is invisible to naked eyes. For example, this makes it possible to cope with a case where it is preferable not to print the authentication template in a form visible to naked eyes for reasons such as design, or the like.

Configuration of Authentication Device 12

FIG. 7 is a diagram illustrating an exemplary configuration of the authentication device 12. At least some of functional units illustrated in FIG. 7 are implemented by executing a predetermined program by a CPU of a computer included in the authentication device 12.

As illustrated in FIG. 7, the authentication device 12 includes a biometric information reading unit 61, a biometric information feature amount extraction unit 62, an authentication template reading unit 63, a template conversion unit 64, a conversion rule storage unit 65, an authentication unit 66, a correct answer template storage unit 67, and an authentication result display unit 68.

The biometric information reading unit 61 includes a sensor that reads various types of biometric information described above. The biometric information reading unit 61 reads biometric information of the same type as the biometric information read by the authentication information issuing device 11. The biometric information reading unit 61 reads user's biometric information and checks quality.

In a case where the quality of the biometric information is not sufficient, the biometric information reading unit 61 reads the biometric information again. On the other hand, in a case where the quality of the biometric information is sufficient, the biometric information reading unit 61 outputs the read biometric information to the biometric information feature amount extraction unit 62 as biometric information for authentication.

The biometric information feature amount extraction unit 62 extracts a feature amount from the biometric information for authentication supplied from the biometric information reading unit 61 and outputs the feature amount to the template conversion unit 64.

The authentication template reading unit 63 includes a sensor that reads an authentication template. The authentication template reading unit 63 reads the authentication template and outputs the authentication template to the template conversion unit 64.

The template conversion unit 64 converts the authentication template supplied from the authentication template reading unit 63 into an answer template that is one type of answer information using the feature amount supplied from the biometric information feature amount extraction unit 62 and outputs the converted answer template to the authentication unit 66. The answer information is information generated from the authentication information using the user's biometric information and is compared with the correct answer information when the authentication information is verified. The answer template represents answer information using an image and is compared with the correct answer template when the authentication unit 66 in the subsequent stage verifies the authentication template. According to the biometric information read for authentication, the answer template generated by the conversion may be information that is the same as or different from the correct answer template.

A method for converting the authentication template is stored in the conversion rule storage unit 65 in advance as conversion rules. Similarly to the conversion of the basic template, the authentication template is converted by dividing the authentication template into a plurality of regions and using a feature amount for each region according to the conversion rules.

The authentication unit 66 performs user authentication by comparing the answer template supplied from the template conversion unit 64 with the correct answer template acquired from the correct answer template storage unit 67. Specifically, the authentication unit 66 calculates a similarity between the answer template and the correct answer template and performs user authentication on the basis of the calculated similarity.

In a case where the similarity between the answer template and the correct answer template exceeds a predetermined threshold, the authentication unit 66 determines that the user who has purchased the ticket is consistent with the user to be a target of the user authentication whose biometric information for authentication is read or the like (user who is about to enter event venue). On the other hand, in a case where the similarity between the answer template and the correct answer template is equal to or less than the predetermined threshold, the authentication unit 66 determines that the user who has purchased the ticket is not consistent with the user to be the target of the user authentication whose biometric information for authentication is read or the like.

FIGS. 8A and 8B are diagrams illustrating an example of an answer template at the time of authentication. As described above, the basic template and the correct answer template may be the same information or different information. FIG. 8A illustrates an example of a case where the basic template and the correct answer template are the same information, and FIG. 8B illustrates an example of a case where the basic template and the correct answer template are different information.

In the example in FIG. 8A, as described above, a basic template 1 that is the same information as the correct answer template is reversibly converted into an authentication template at the time of issuing a ticket.

With respect to the above, at the time of authentication, the template conversion unit 64 performs inverse conversion corresponding to the conversion from the basic template into the authentication template so as to convert the authentication template into an answer template 1.

At this time, in a case where a fingerprint used when the ticket is issued is the same as a fingerprint used at the time of authentication, the answer template 1 generated by inverse conversion is restored as information same as a correct answer template 1. Then, the authentication unit 66 determines that the answer template 1 is consistent with the correct answer template 1 acquired from the correct answer template storage unit 67.

On the other hand, in the example in FIG. 8B, at the time of issuing a ticket, the basic template 1 is irreversibly converted into an authentication template.

With respect to the above, at the time of authentication, the template conversion unit 64 further converts the authentication template into an answer template 2.

At this time, in a case where a fingerprint used when the ticket is issued is the same as a fingerprint used at the time of authentication, the answer template 2 generated by conversion is converted into information that is the same as a correct answer template 2 different from the correct answer template 1. Then, the authentication unit 66 determines that the answer template 2 is consistent with the correct answer template 2 acquired from the correct answer template storage unit 67.

Note that the correct answer template storage unit 67 stores information expected as a result of performing conversion twice on the basic template 1 at the time of issuance and at the time of authentication as the correct answer template 2 in advance.

Information representing the result of the user authentication determined in this way is output from the authentication unit 66 to the authentication result display unit 68 in FIG. 7.

The authentication result display unit 68 presents the result of the user authentication by the authentication unit 66, for example, by displaying the result on a display. Note that the result of the user authentication may be explicitly presented to the user whose biometric information is read or may be presented to only the service provider side that manages the event in order to make a response according to the result of the user authentication.

3. Operation of Each Device

Here, an operation of each device having the above configuration will be described.

Operation of Authentication Information Issuing Device 11

Figure 9:
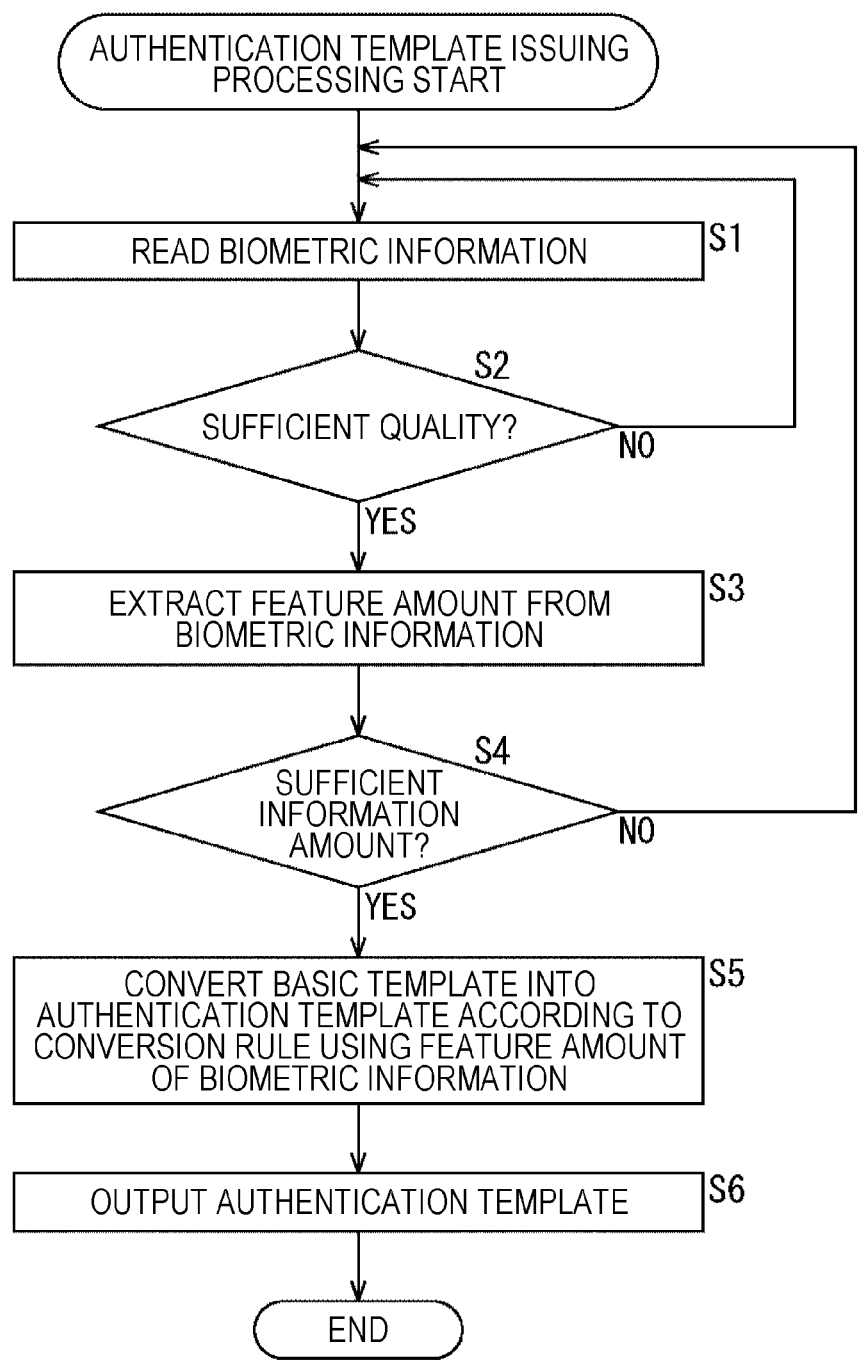
FIG. 9 is a flowchart for explaining authentication template issuance processing.

First, authentication template issuance processing by the authentication information issuing device 11 will be described with reference to the flowchart in FIG. 9.

In step S1, the biometric information reading unit 51 reads biometric information for generation.

In step S2, the biometric information reading unit 51 determines whether or not quality of the biometric information is sufficient.

In a case where it is determined in step S2 that the quality of the biometric information is not sufficient, the procedure returns to step S1, and the biometric information is repeatedly read until biometric information with sufficient quality is obtained. Note that, in a case where reading of the biometric information fails a predetermined number of times, the processing ends.

On the other hand, in a case where it is determined in step S2 that the quality of the biometric information is sufficient, the procedure proceeds to step S3.

In step S3, the biometric information feature amount extraction unit 52 extracts a feature amount from the biometric information for generation.

In step S4, the biometric information feature amount extraction unit 52 determines whether or not the extracted feature amount has a sufficient information amount.

In a case where it is determined in step S4 that the extracted feature amount does not have the sufficient information amount, the procedure returns to step S1, and the subsequent processing is executed.

On the other hand, in a case where it is determined in step S4 that the extracted feature amount has the sufficient information amount, the procedure proceeds to step S5.

In step S5, the template conversion unit 53 converts a basic template into an authentication template according to conversion rules using the feature amount of the biometric information for generation.

In step S6, the authentication template output unit 56 outputs the authentication template.

Operation of Authentication Device 12

Figure 10:
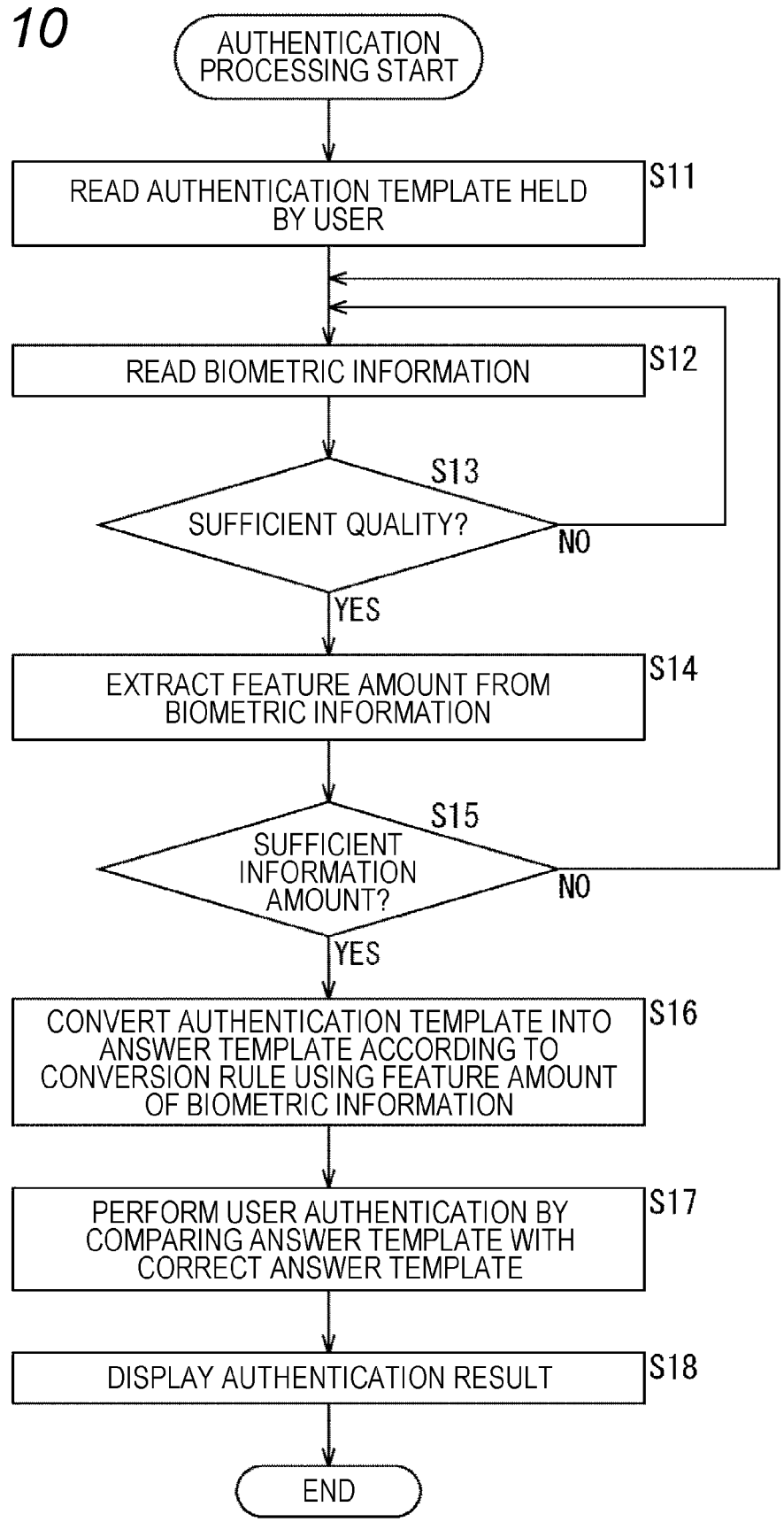
FIG. 10 is a flowchart for explaining authentication processing.

Next, authentication processing of the authentication device 12 will be described with reference to the flowchart in FIG. 10.

In step S11, the authentication template reading unit 63 reads an authentication template held by a user.

In step S12, the biometric information reading unit 61 reads biometric information for authentication.

In step S13, the biometric information reading unit 61 determines whether or not quality of the biometric information is sufficient.

In a case where it is determined in step S13 that the quality of the biometric information is not sufficient, the procedure returns to step S12, and the biometric information is repeatedly read until biometric information with sufficient quality is obtained. Note that, in a case where reading of the biometric information fails a predetermined number of times, the processing ends.

On the other hand, in a case where it is determined in step S13 that the quality of the biometric information is sufficient, the procedure proceeds to step S14.

In step S14, the biometric information feature amount extraction unit 62 extracts a feature amount from the biometric information for authentication.

In step S15, the biometric information feature amount extraction unit 62 determines whether or not the extracted feature amount has a sufficient information amount.

In a case where it is determined in step S15 that the extracted feature amount does not have the sufficient information amount, the procedure returns to step S12, and the subsequent processing is executed.

On the other hand, in a case where it is determined in step S15 that the extracted feature amount has the sufficient information amount, the procedure proceeds to step S16.

In step S16, the template conversion unit 64 converts the authentication template into an answer template according to conversion rules using the feature amount of the biometric information for authentication.

In step S17, the authentication unit 66 performs user authentication by comparing the answer template with a correct answer template.

In step S18, the authentication result display unit 68 presents a result of the user authentication.

As described above, the authentication system 1 can perform the user authentication using the biometric information without holding the biometric information. Because information unique to a living body is used, security strength similar to a physical key can be enjoyed without troubles of taking a key and any risk of losing the key.

Because the authentication system 1 has a mechanism for converting a template using biometric information, a system that performs user authentication with a simple system configuration can be realized.

Furthermore, the authentication system 1 can independently operate devices at the time of purchasing and at the time of using a ticket.

Note that, for example, the authentication system 1 is used as the time of issuing a ticket for a concert or the like and at the time of authentication. In this case, only the user who has been successfully authenticated can enter a venue of a concert or the like so that it is possible to prevent ticket resale.

For example, the authentication system 1 is used to issue an entrance ticket of an entertainment park such as an amusement park and to manage a re-visitor using the entrance ticket. In this case, only the user who has been successfully authenticated can re-enter the entertainment park, and thereby, it is possible to permit only the purchaser of the entrance ticket to re-enter the entertainment park.

For example, the authentication system 1 is used to order a meal in a food court or the like and to receive the ordered meal. In this case, it is possible to easily confirm that the person who has order the meal is the same as the person who receives the meal.

4. Second Embodiment

The authentication system 1 may be used to manage rental items. For example, in a case where lent slippers are scattered in inns or the like, the authentication system 1 is used by a user who lost lent slippers to find own slippers.

Figure 11:
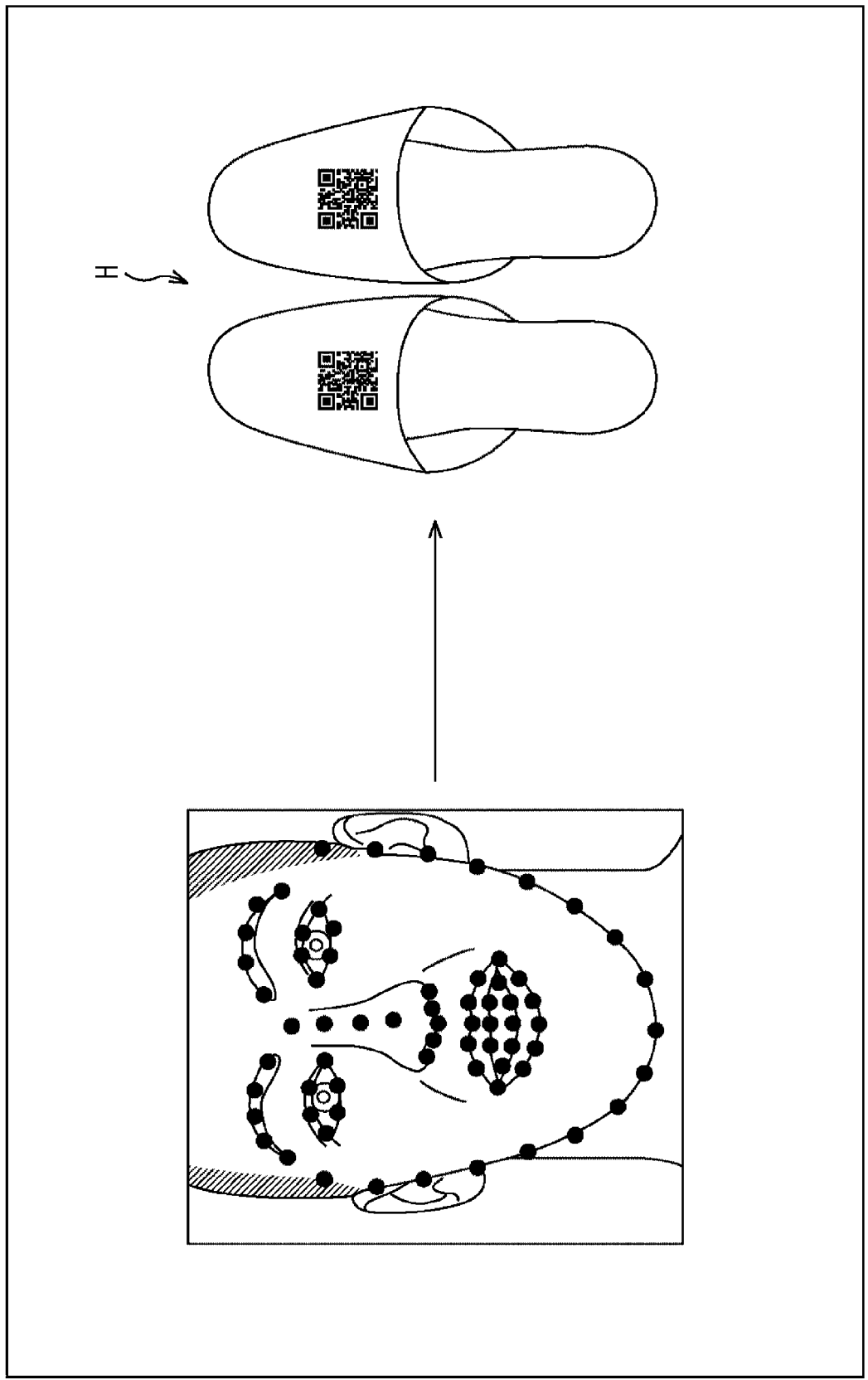
FIG. 11 is a diagram illustrating an example of slippers on which an authentication template is printed.

FIG. 11 is a diagram illustrating an example of slippers on which an authentication template is printed.

As illustrated in the left side of FIG. 11, at the time of lending slippers, a face image of a user who borrows the slippers is read by an authentication information issuing device 11 as biometric information for generation. The authentication information issuing device 11 extracts a feature amount from the read face image and converts a basic template into an authentication template using the feature amount of the face.

A black dot on the face image in the left side of FIG. 11 represents a feature point of the face from which the feature amount is extracted by the authentication information issuing device 11.

As illustrated in the right side in FIG. 11, slippers H on which a two-dimensional code as the authentication template generated by the authentication information issuing device 11 is printed are lent to a user. Note that the two-dimensional code printed on the slipper H is printed with transparent ink which can be confirmed only at a predetermined wavelength.

Figure 12:
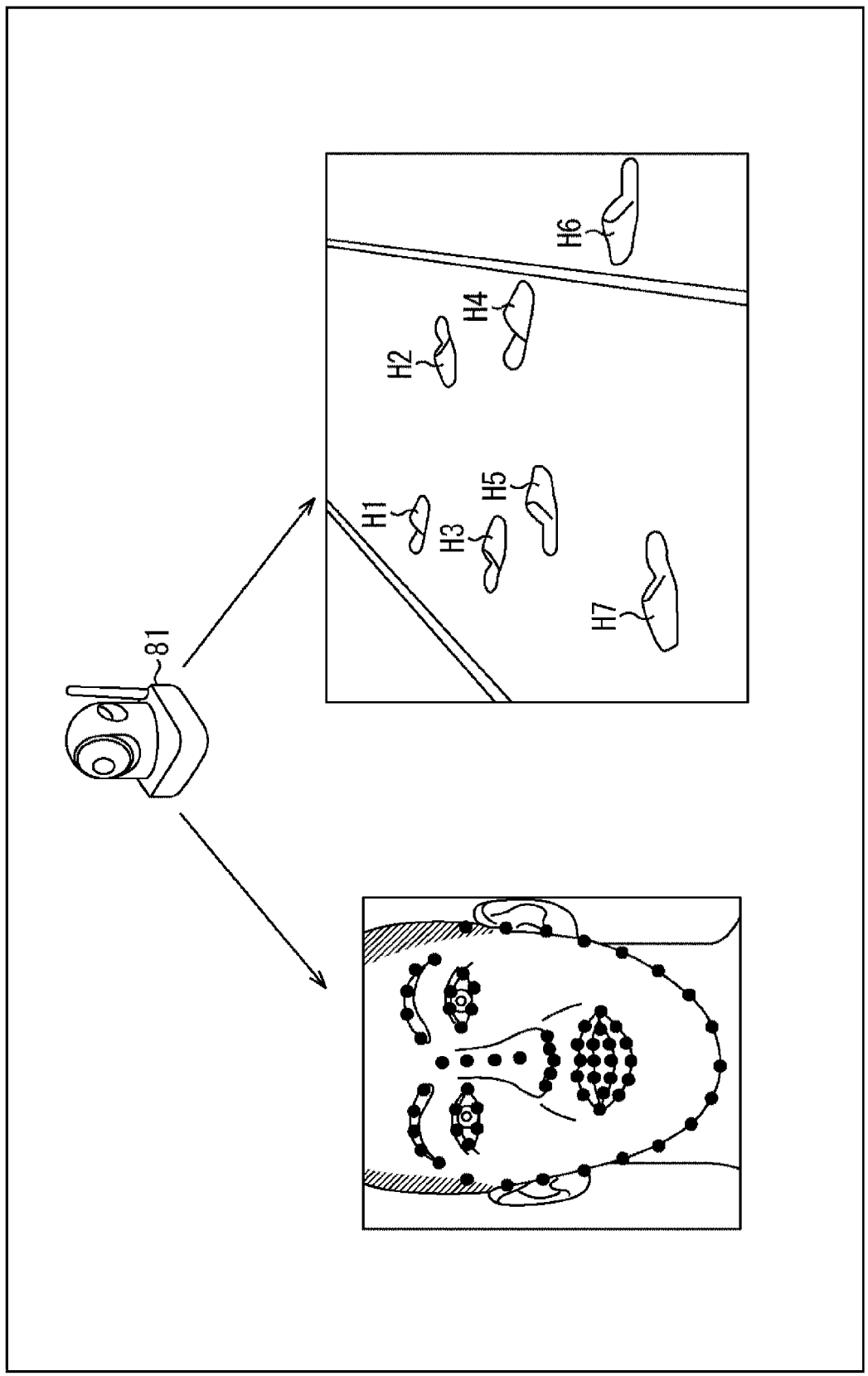
FIG. 12 is a diagram illustrating a state where slippers are scattered.

FIG. 12 is a diagram illustrating a state where slippers are scattered.

As illustrated in the right side in FIG. 12, it is assumed that slippers H1 to H7 be scattered on the floor of the inn. In this case, a camera 81 provided on a ceiling reads a face image of a user who is looking for slippers that the user has lent as biometric information for authentication and reads authentication templates respectively printed on the slippers H1 to H7.

The camera 81 functions as a biometric information reading unit 61 and an authentication template reading unit 63 of an authentication device 12. A template conversion unit 64 converts the two-dimensional codes respectively read from the slippers H1 to H7 into answer templates using the feature amount of the face.

An authentication unit 66 specifies the two-dimensional code converted using the biometric information read from the user whose biometric information for authentication is read (user who is looking for slippers that user has lent) on the basis of a similarity between each answer template and a correct answer template.

An authentication result display unit 68 presents that the slippers on which the two-dimensional code specified by the authentication unit 66 is printed are the slippers lent to the user.

Figure 13:
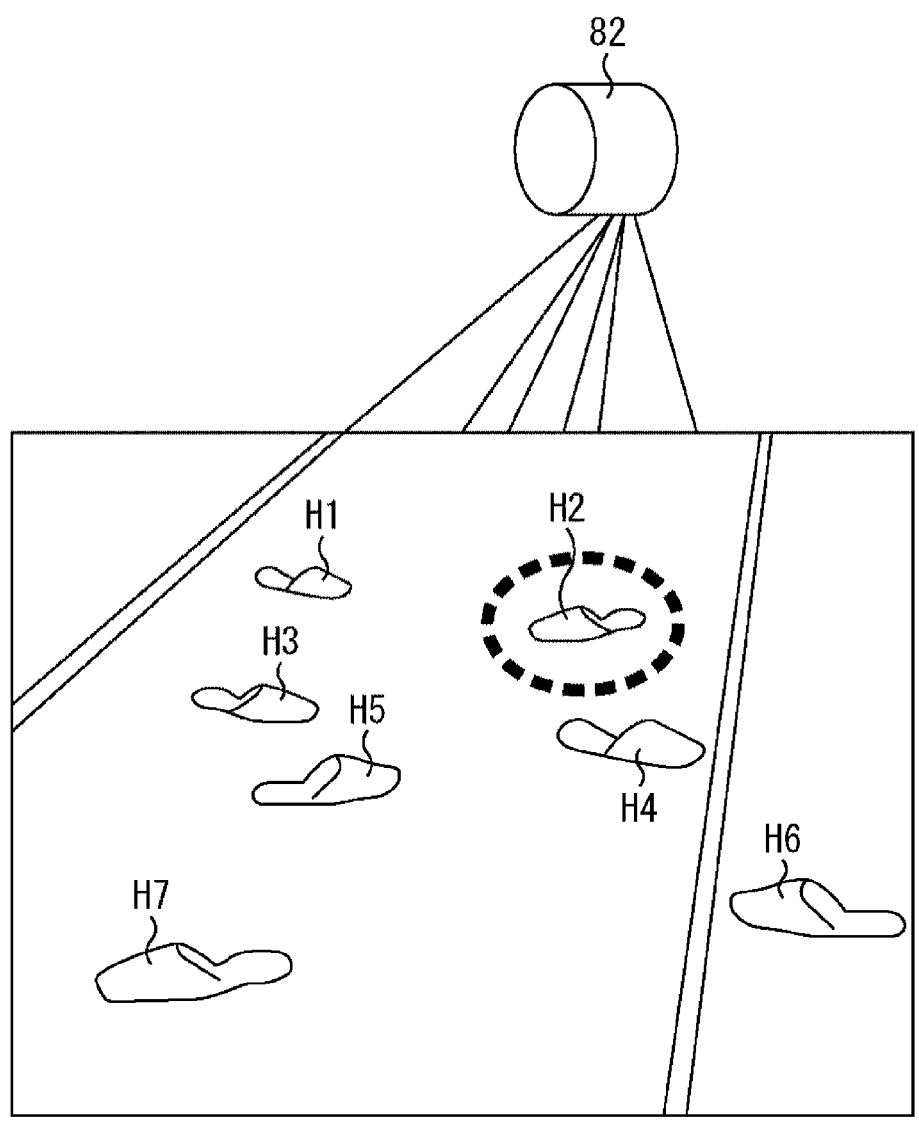
FIG. 13 is a diagram illustrating an example of a presentation method.

FIG. 13 is a diagram illustrating an example of a presentation method.

As illustrated in FIG. 13, a projector 82 provided on a ceiling presents, to the user, that the slippers H2 are slippers lent to the user, for example, by illuminating the periphery of the slippers H2 surrounded by a dashed circle. Here, the projector 82 functions as the authentication result display unit 68 of the authentication device 12.

As described above, the user can receive assistance to find what the user has borrowed.

Furthermore, the authentication system 1 can be applied to a system that manages whether or not a rental item (for example, slipper) is returned.

Note that, in the above, a case has been described where the authentication template is printed with the transparent ink that is invisible to naked eyes. However, in a case where a design is not considered, a seal on which the authentication template is printed may be attached to slippers or the like.

Furthermore, not only the authentication template is printed, but also an IC chip that stores data indicating the authentication template may be embedded in slippers or the like. In this case, the authentication device 12 reads the data stored in the IC chip as the authentication template.

For example, in a case where the biometric information of the user is stored in the IC chip, the authentication template is unnecessary. However, there is a risk of leakage of the biometric information that is personal information, and it is necessary to reliably discard the biometric information. In this case, a large cost is caused to handle the biometric information.

On the other hand, by using the authentication template, not the biometric information, as the data stored in the IC chip, such a cost can be reduced.

5. Third Embodiment

Some of functions of an authentication information issuing device 11 and functions of an authentication device 12 may be provided in a mobile terminal. By using the mobile terminal having such functions, a ticket is purchased and used as described above.

Hereinafter, an example of a case will be described where a user purchases an electronic ticket using the mobile terminal and enters an event venue.

Figure 14:
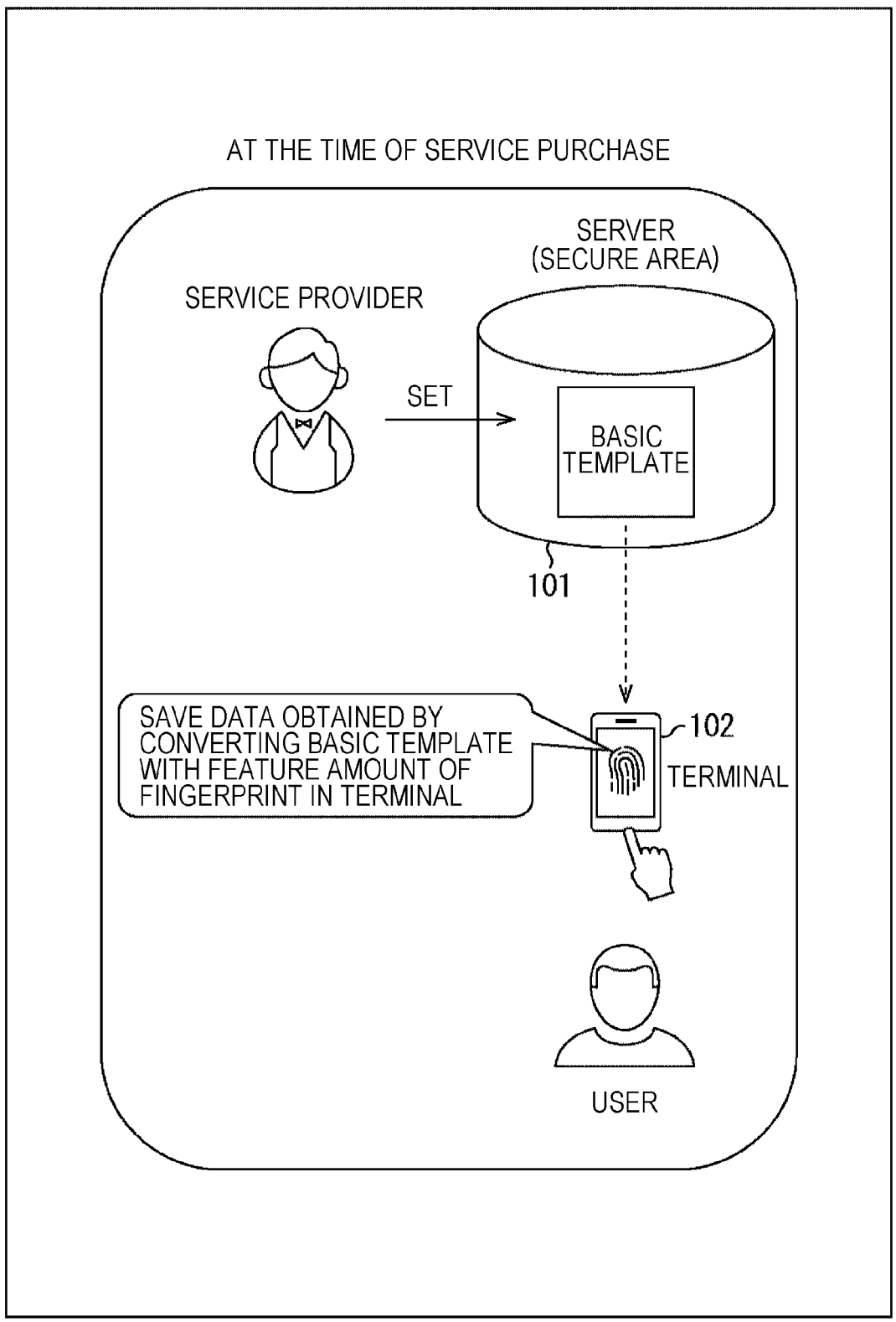
FIG. 14 is a diagram illustrating a flow of processing of the authentication system at the time of purchase of an electronic ticket.

FIG. 14 is a diagram illustrating a flow of processing of an authentication system at the time of purchase of an electronic ticket.

The authentication system in FIG. 14 includes a server 101 and a mobile terminal 102. The functions of the authentication information issuing device 11 in FIG. 1 are shared by the server 101 and the mobile terminal 102.

The server 101 is, for example, a server device installed in a secure area. A service provider that manages an event using the authentication system sets a basic template to the server 101 in advance.

The mobile terminal 102 includes a device such as a smartphone, a tablet terminal, or a personal computer (PC). A user purchases an electronic ticket according to a guide or the like presented by an application installed in the mobile terminal 102, for example.

At the time when the ticket is purchased, the mobile terminal 102 acquires the basic template from the server 101 as indicated by a dashed arrow in FIG. 14. Note that data is exchanged between the server 101 and the mobile terminal 102 using secure communication.

In the mobile terminal 102, a sensor that reads user's biometric information is provided. When the electronic ticket is purchased, the mobile terminal 102, for example, reads a fingerprint of the user, and converts the basic template acquired from the server 101 into an authentication template using a feature amount of the read fingerprint. Data of the generated authentication template is saved in the mobile terminal 102 as the electronic ticket.

Then, the user who has purchased the electronic ticket brings the mobile terminal 102 that saves the electronic ticket at the time of using the electronic ticket.

Figure 15:
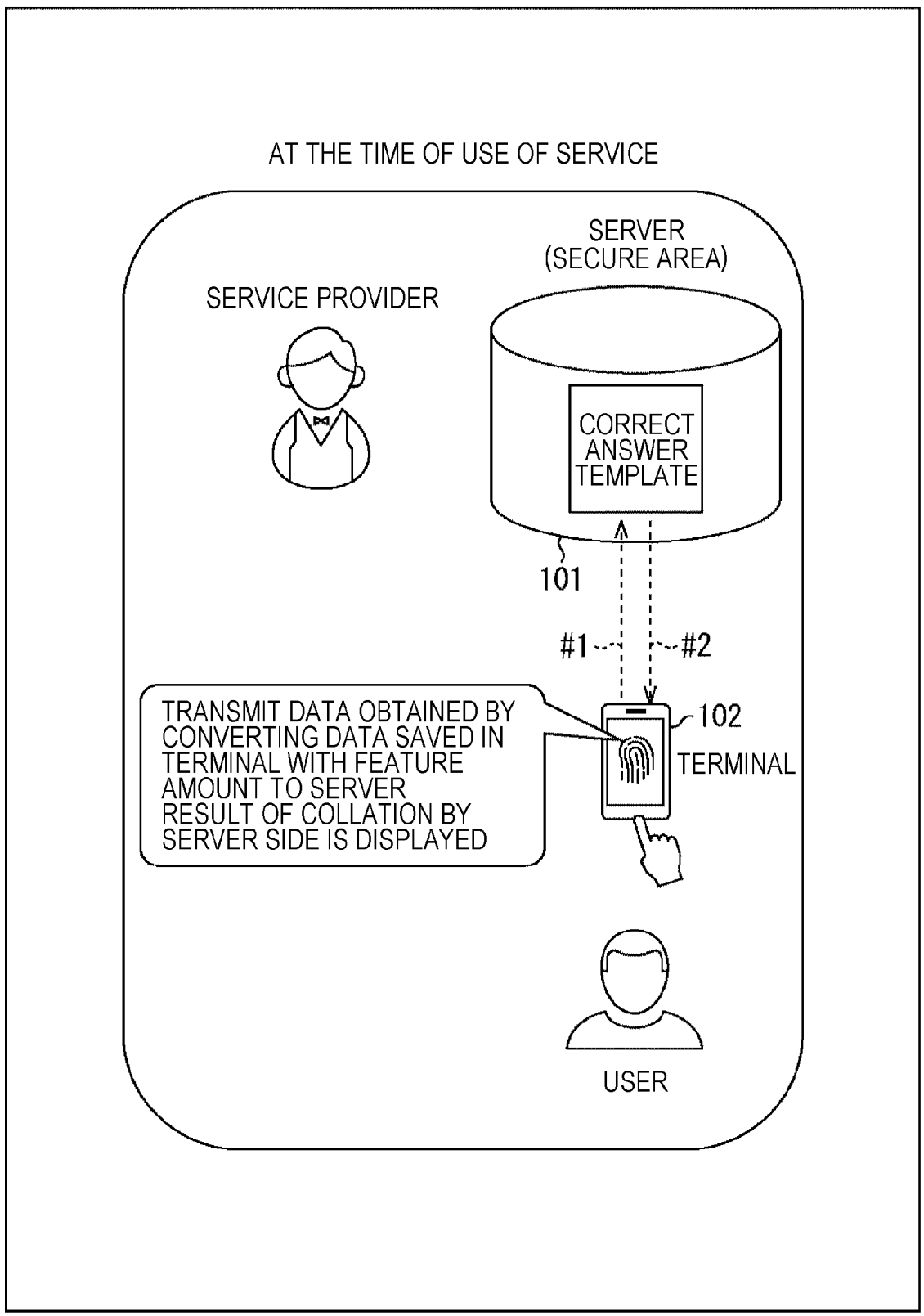
FIG. 15 is a diagram illustrating a flow of processing of the authentication system at the time of use of the electronic ticket.

FIG. 15 is a diagram illustrating a flow of processing of the authentication system at the time when the electronic ticket is used.

An authentication system in FIG. 15 includes the server 101 and the mobile terminal 102 as in the authentication system in FIG. 14. The functions of the authentication device 12 in FIG. 1 are shared by the server 101 and the mobile terminal 102.

At the time when the electronic ticket is used, the server 101 stores a correct answer template. The service provider sets the correct answer template to the server 101 in advance. Furthermore, the server 101 performs user authentication using an answer template received from the mobile terminal 102.

The mobile terminal 102 reads a fingerprint of the user and converts the authentication template saved in the mobile terminal 102 into the answer template using a feature amount of the read fingerprint. The mobile terminal 102 transmits data of the answer template to the server 101 as indicated by an arrow #1 in FIG. 15.

Furthermore, as indicated by an arrow #2 in FIG. 15, the mobile terminal 102 receives a result of the user authentication performed by the server 101 and displays the result on a display provided in the mobile terminal 102. The user shows the result of the user authentication displayed on the mobile terminal 102, for example, to the service provider so as to receive a response according to the result of the user authentication from the service provider.

Figure 16:
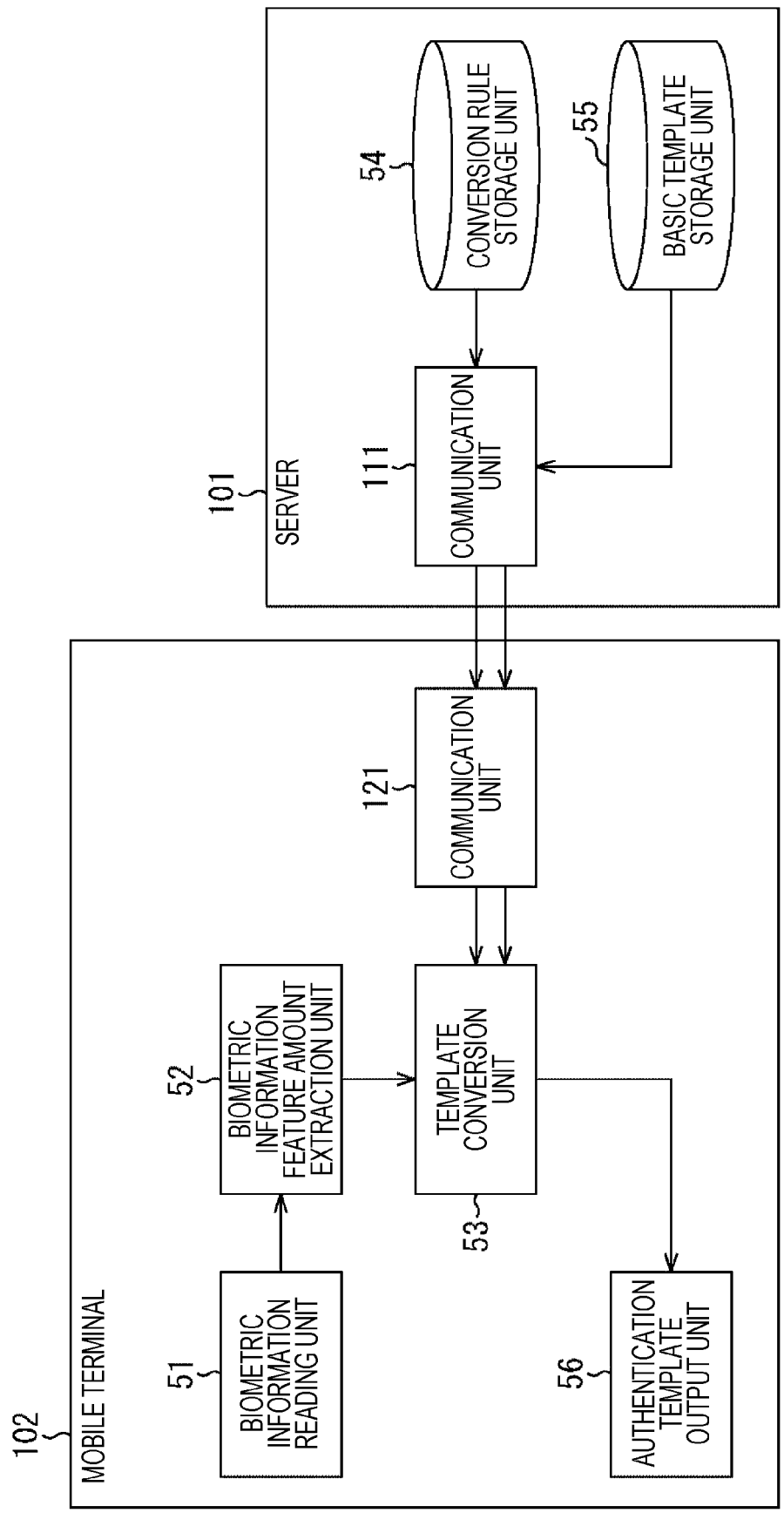
FIG. 16 is a block diagram illustrating an exemplary configuration of a server and a mobile terminal at the time of purchase of the electronic ticket.

FIG. 16 is a block diagram illustrating an exemplary configuration of the server 101 and the mobile terminal 102 at the time of purchase of an electronic ticket.

As illustrated in FIG. 16, the server 101 includes a conversion rule storage unit 54, a basic template storage unit 55, and a communication unit 111.

Note that, in FIG. 16, a component same as the component of the authentication information issuing device 11 in FIG. 4 is denoted with the same reference numeral. Overlapped description will be appropriately omitted.

The communication unit 111 acquires information indicating conversion rules and a basic template respectively from the conversion rule storage unit 54 and the basic template storage unit 55 and transmits the acquired information and template to the mobile terminal 102.

On the other hand, as illustrated in FIG. 16, the mobile terminal 102 includes a biometric information reading unit 51, a biometric information feature amount extraction unit 52, a template conversion unit 53, an authentication template output unit 56, and a communication unit 121.

The communication unit 121 receives the information indicating the conversion rules and the basic template transmitted from the server 101 and outputs the received information to the template conversion unit 53.

In the template conversion unit 53, the basic template supplied from the communication unit 121 is converted on the basis of the biometric information for generation supplied from the biometric information feature amount extraction unit 52 according to the conversion rules supplied from the communication unit 121, and an authentication template is generated. The authentication template generated by the template conversion unit 53 is supplied to the authentication template output unit 56.

Figure 17:
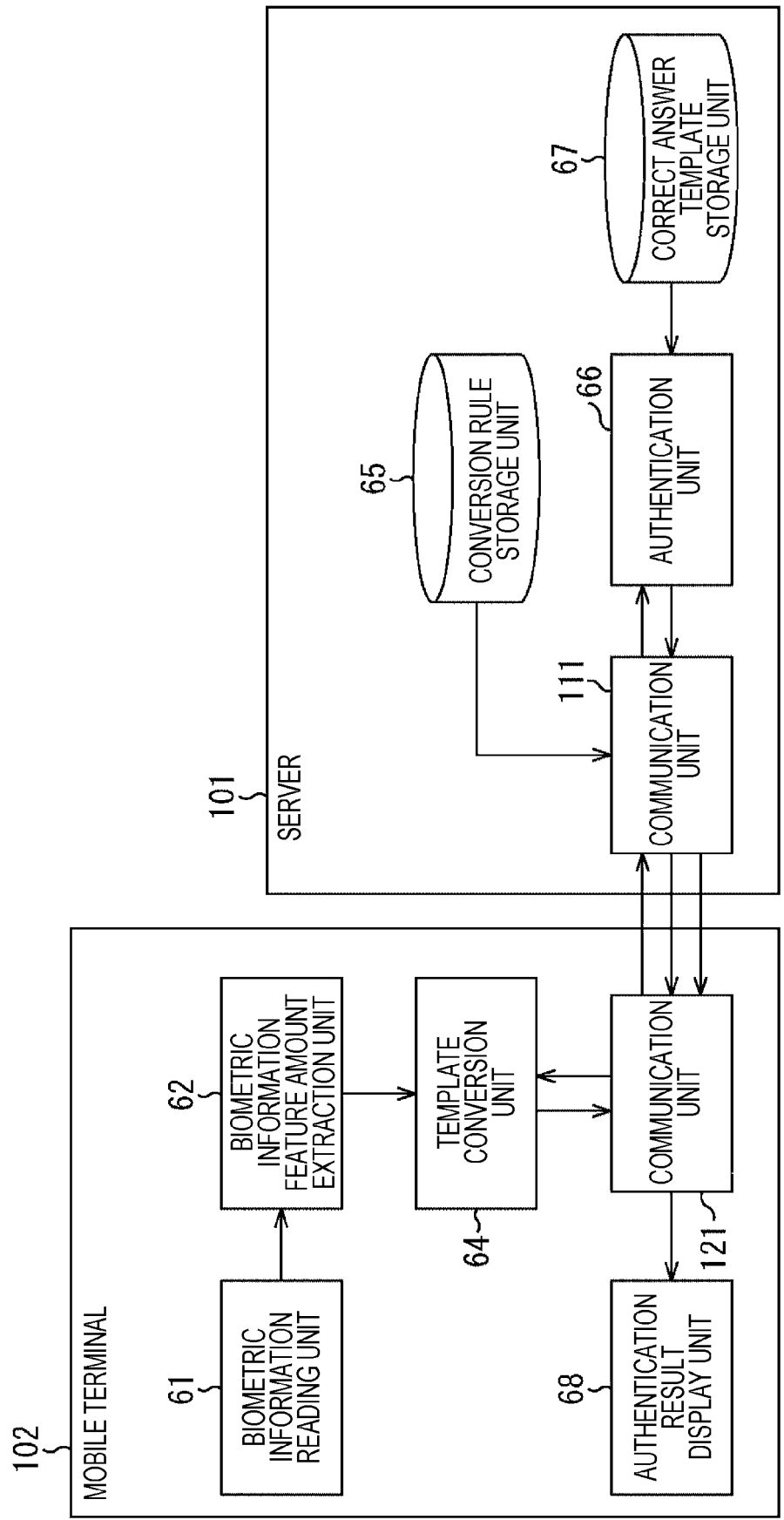
FIG. 17 is a block diagram illustrating an exemplary configuration of the server and the mobile terminal at the time of use of the electronic ticket.

FIG. 17 is a block diagram illustrating an exemplary configuration of the server 101 and the mobile terminal 102 at the time of use of an electronic ticket.

As illustrated in FIG. 17, the server 101 includes a conversion rule storage unit 65, an authentication unit 66, a correct answer template storage unit 67, and a communication unit 111.

Note that, in FIG. 17, a component same as the component of the authentication device 12 in FIG. 7 is denoted with the same reference numeral. Overlapped description will be appropriately omitted.

The communication unit 111 acquires information indicating conversion rules from the conversion rule storage unit 65 and outputs the information to the mobile terminal 102. Furthermore, the communication unit 111 receives an answer template transmitted from the mobile terminal 102 and outputs the answer template to the authentication unit 66.

The authentication unit 66 performs user authentication by comparing the answer template acquired from the mobile terminal 102 with a correct answer template stored in the correct answer template storage unit 67. The authentication unit 66 outputs information indicating a result of the user authentication to the communication unit 111.

The communication unit 111 transmits the information indicating the result of the user authentication supplied from the authentication unit 66 to the mobile terminal 102.

On the other hand, as illustrated in FIG. 17, the mobile terminal 102 includes a biometric information reading unit 61, a biometric information feature amount extraction unit 62, a template conversion unit 64, an authentication result display unit 68, and a communication unit 121.

The communication unit 121 receives information indicating the conversion rules transmitted from the server 101 and outputs the information to the template conversion unit 64.

In the template conversion unit 64, an authentication template saved in the mobile terminal 102 is converted on the basis of a feature amount of biometric information for authentication supplied from the biometric information feature amount extraction unit 52 according to the conversion rules supplied from the communication unit 121 so as to generate an answer template. The answer template generated by the template conversion unit 53 is supplied to the communication unit 121.

The communication unit 121 transmits the answer template supplied from the template conversion unit 64 to the server 101.

On the other hand, the communication unit 121 receives the information indicating the result of the user authentication transmitted from the server 101 and outputs the information to the authentication result display unit 68.

As described above, the user can be authenticated using the biometric information with the mobile terminal 102. In this case, the service provider can perform the user authentication using the biometric information without managing the user's biometric information on the service provider side.

Furthermore, the user can be authenticated without incurring a risk of leakage of the user's biometric information. Moreover, the user can easily and securely use a service for purchasing an electronic ticket or the like using the mobile terminal 102.

Note that the server 101 may be provided in a locker (so-called baggage locker) in a station or a delivery box. In this case, the user locks or unlocks the locker in the station or the delivery box by making the mobile terminal 102 read the biometric information.

In a station or the like, a locker that can be locked with a transportation IC card exists. In a case where a user loses an IC card after locking a locker and another person picks up the IC card, the another person can unlock the locker locked by a valid user.

On the other hand, by making the locker in the station be unlocked using the mobile terminal 102, biometric information of a person who has locked the locker is needed at the time of opening the locker. Therefore, a more secure service can be provided.

6. Fourth Embodiment

At the time of purchase of a ticket, biometric information of a plurality of users may be used to convert a basic template. Then, at the time of use of the ticket, one or more users of the plurality of users having the biometric information used to convert the basic template may be authenticated using the biometric information.

Figure 18:
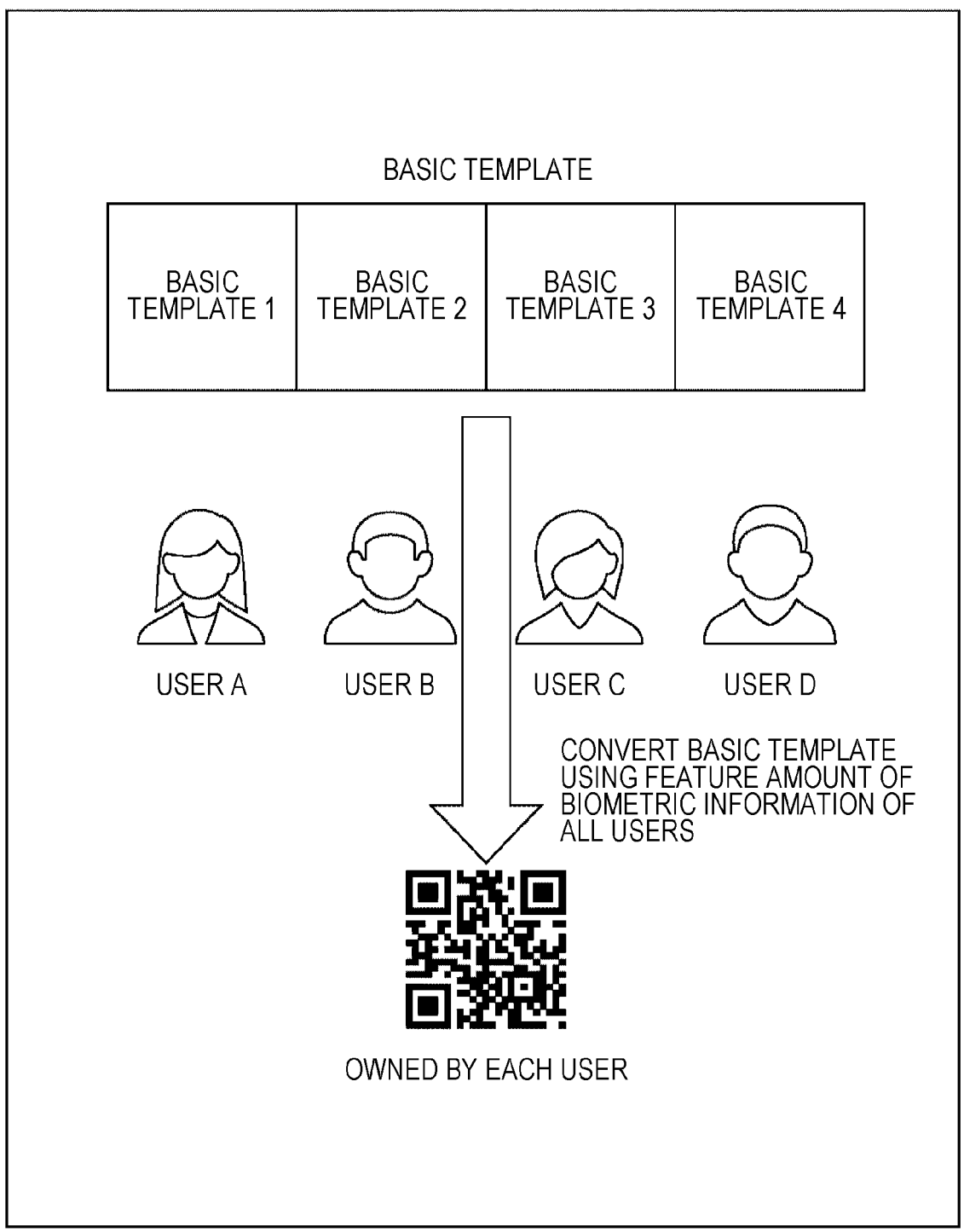
FIG. 18 is a diagram illustrating an example of a basic template conversion method using biometric information of a plurality of users.

FIG. 18 is a diagram illustrating an example of a basic template conversion method using biometric information of a plurality of users.

As illustrated in the upper side of FIG. 18, for example, data in which basic templates 1 to 4 are combined is set to an authentication information issuing device 11 as a basic template in advance.

At the time of purchase of a ticket, the authentication information issuing device 11 reads the biometric information of the plurality of users as biometric information for generation. A feature amount is extracted from the biometric information for generation, and the basic template is converted into an authentication template using the feature amount extracted from the biometric information for generation.

In FIG. 18, biometric information of users A to D is read by the authentication information issuing device 11, and the basic template is converted into a two-dimensional code that is an authentication template using a feature amount of the biometric information of all the users.

Here, it is assumed that a ticket purchaser group includes the users A to D. One authentication template is issued regardless of the number of users included in the purchaser group.

The authentication template issued by the authentication information issuing device 11 is printed on a paper ticket or the like, and then, is owned by each user whose biometric information for generation is read.

Figure 19:
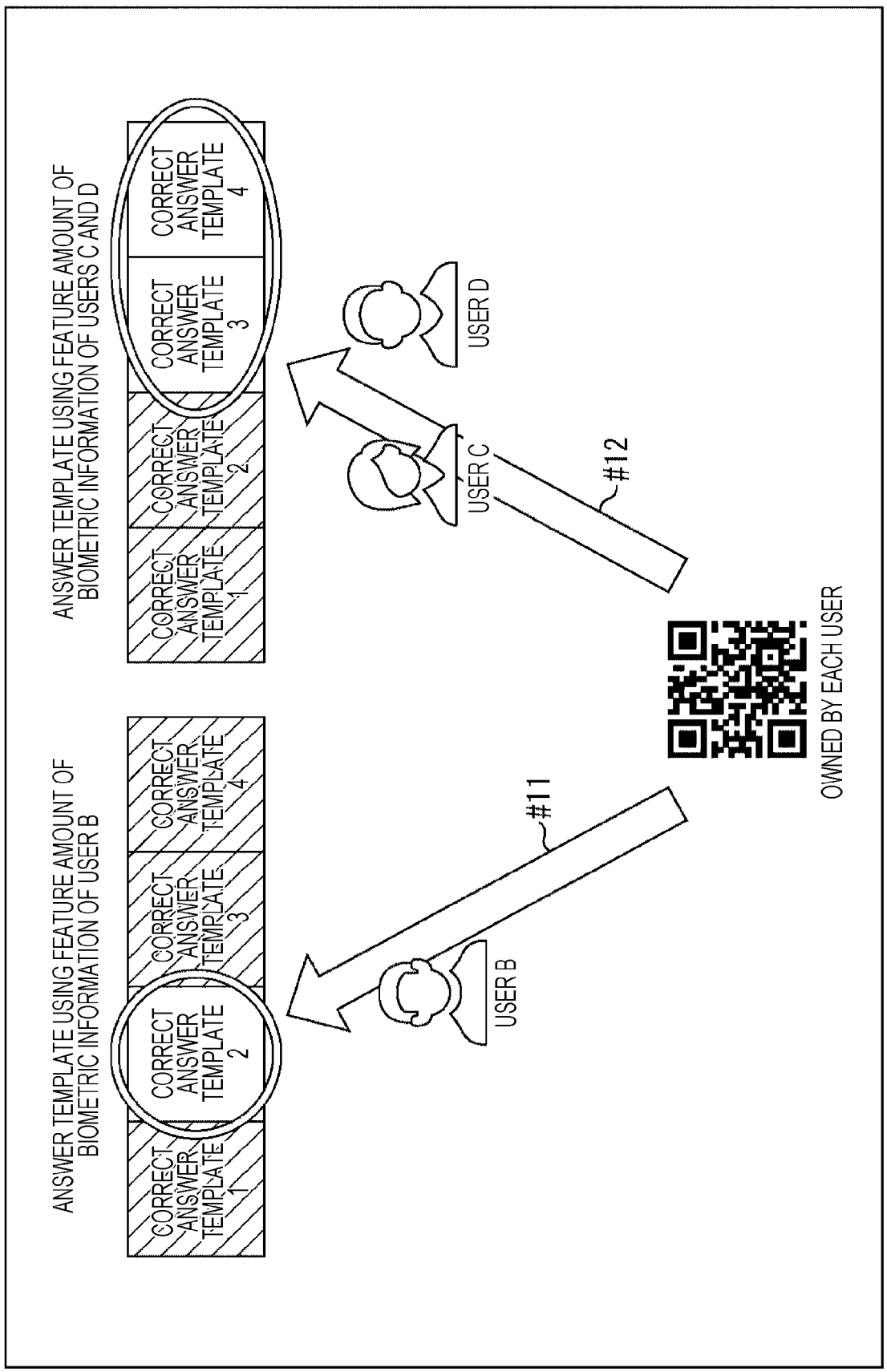
FIG. 19 is a diagram illustrating an example of a method for converting and a method for verifying an authentication template converted using the biometric information of the plurality of users.

FIG. 19 is a diagram illustrating an example of a method for converting and a method for verifying an authentication template converted using the biometric information of the plurality of users.

As illustrated in the lower side of FIG. 19, the user brings a ticket on which the authentication template owned by each person in the purchaser group is printed to an event venue.

At the time of use of the ticket, an authentication device 12 reads the authentication template printed on the ticket and reads biometric information of one or a plurality of users as biometric information for authentication. A feature amount is extracted from the biometric information for authentication, and the authentication template is converted into an answer template using the feature amount extracted from the biometric information for authentication.

In the example in the left side in FIG. 19, as pointed by an arrow #11, the biometric information of the user B is read by the authentication device 12, and an answer template in which only a correct answer template 2 of correct answer templates 1 to 4 is correctly restored is generated.

Furthermore, in the example in the right side in FIG. 19, as pointed by an arrow #12, the biometric information of the users C and D is read by the authentication device 12, and an answer template in which only the correct answer templates 3 and 4 of the correct answer templates 1 to 4 are correctly restored is generated.

In the authentication device 12, a correct answer template in which the correct answer templates 1 to 4 are combined is set in advance. The authentication device 12 compares the answer template with the correct answer template and determines whether or not the user of which the biometric information for authentication is read is included in the purchaser group of which the biometric information for generation is read at the time of issuance of the authentication template so as to perform user authentication.

Here, in a case where a part of the answer template is consistent with the correct answer template, the authentication device 12 presents information indicating that the user whose biometric information for authentication is read is the user included in the purchaser group.

The user who has received such presentation is permitted to enter the event venue as a user who has been successfully authenticated.

In the example in the left side in FIG. 19, the biometric information of the user B is read in the user authentication based on the authentication template issued using the biometric information of the purchaser group, and the correct answer template 2 is correctly restored. Therefore, it is determined that the user B is included in the purchaser group, and the user B is successfully authenticated.

Furthermore, in the example in the right side in FIG. 19, the biometric information of the users C and D is read in the user authentication based on the authentication template issued using the biometric information of the purchaser group, and the correct answer templates 3 and 4 are correctly restored. Therefore, it is determined that the users C and D are included in the purchaser group, and the users C and D are successfully authenticated.

Note that, for example, a range of a service provided in the event venue may be changed according to a similarity between an answer template converted using biometric information of a plurality of or all of users who use tickets and a correct answer template (matching ratio).

As described above, the authentication system 1 can perform user authentication based on the authentication template issued using the biometric information of the plurality of persons.

Note that this authentication method may be used to lock or unlock a locker in a station or a delivery box. For example, at the time when the locker in the station or the delivery box is locked, an authentication template converted using biometric information read from a plurality of persons such as a parent and a child is issued. Then, one of the persons who have locked the locker in the station and the delivery box unlocks the locker in the station or the delivery box using the authentication template.

In this way, the locker in the station of the delivery box can be used by a group including a plurality of persons.

Furthermore, this authentication method may be used to lock and unlock a door of a house. For example, when the door of the house is locked, a key terminal to be a key of the door of the house holds an authentication template that is issued using biometric information of all users included in the family. The user goes out as carrying the key terminal when going out.

When returning home, the user can make a sensor, provided near the door of the house, read the biometric information and the authentication template held by the key terminal and can unlock the door of the house. In a case where the key terminal is lost, even if another person who has found the key terminal makes the sensor read biometric information of the another person and the authentication template held by the key terminal, the answer template is not consistent with the correct answer template. Therefore, the door of the house is not unlocked.

Furthermore, because it is difficult to decrypt the biometric information used to convert the basic template from the authentication template of the key terminal, the biometric information and the correct answer template used to unlock the door of the house are not leaked.

7. Modification

For example, visual information other than the image and the two-dimensional code described above can be used for basic information, authentication information, answer information, and correct answer information. As such visual information, for example, a signal represented by a pattern of blinking, a color, or the like of light, text information, or the like is assumed.

Furthermore, for example, auditory information and tactile information other than the visual information can be used for the basic information, the authentication information, the answer information, and the correct answer information. As the auditory information, for example, sound is assumed. As the tactile information, for example, a signal represented by a pattern of vibration, motion, heat, or the like is assumed. In this case, for example, waveforms representing the patterns or the like of the auditory information and the tactile information are converted according to the biometric information of the user.

8. Exemplary Configuration of Computer

The above-mentioned series of processing can be executed by hardware or software. In a case where the software executes the series of processing, a program included in the software is installed from a program recording medium to a computer incorporated in dedicated hardware or, for example, a general-purpose personal computer.

Figure 20:
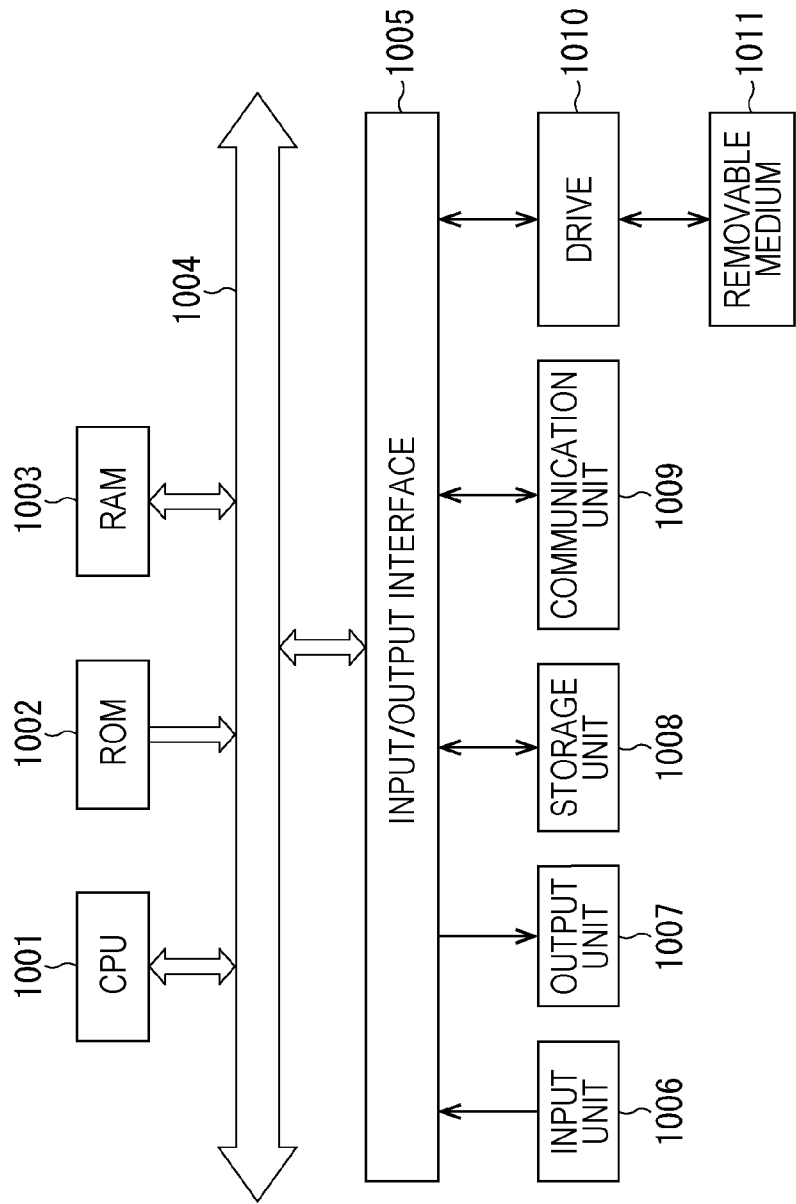
FIG. 20 is a block diagram illustrating an exemplary configuration of hardware of a computer.

FIG. 20 is a block diagram illustrating an exemplary configuration of hardware of the computer for executing the above-mentioned series of processing by the program.

A central processing unit (CPU) 1001, a read only memory (ROM) 1002, and a random access memory (RAM) 1003 are connected to each other with a bus 1004.

In addition, an input/output interface 1005 is connected to the bus 1004. The input/output interface 1005 is connected to an input unit 1006 including a keyboard, a mouse, and the like and an output unit 1007 including a display, a speaker, and the like. Furthermore, the input/output interface 1005 is connected to a storage unit 1008 including a hard disk, a non-volatile memory, and the like, a communication unit 1009 including a network interface and the like, and a drive 1010 that drives a removable medium 1011.

In the computer configured as described above, the CPU 1001 loads, for example, the program stored in the storage unit 1008 to the RAM 1003 via the input/output interface 1005 and the bus 1004 and executes the program so that the above-mentioned series of processing is executed.

The program executed by the CPU 1001 is provided and installed to the storage unit 1008, for example, by recording the program in the removable medium 1011, or via a wired or wireless transmission medium such as a local area network, the Internet, or digital broadcasting.

Note that, the program executed by the computer may be a program in which processing is executed along the order described herein in a time series manner or a program in which the processing is executed in parallel or at a necessary timing, for example, when a call has been performed.

Note that, a system means herein an assembly of a plurality of components (devices, modules (parts), and the like), and it is not considered whether or not all the components are in the same housing. Therefore, both of a plurality of devices respectively housed in different housings from each other and connected via the network and a single device having a plurality of modules housed in one housing are systems.

Note that the effects described herein are only exemplary and not limited to these. Furthermore, there may be an additional effect.

The embodiment of the present technology is not limited to the above-mentioned embodiments, and various changes can be made without departing from the scope of the present technology.

For example, the present technology may have a configuration of cloud computing in which a single function is separately performed by a plurality of devices via a network in cooperation.

Furthermore, each step described with reference to the above-mentioned flowchart can be performed by a single device or can be divided and performed by a plurality of devices.

Moreover, in a case where a plurality of kinds of processing is included in one step, the plurality of kinds of processing included in one step can be executed by a single device or can be divided and executed by a plurality of devices.

Example of Combination of Configurations

The present technology can have the following configurations.

(1)

An authentication device including:

an authentication unit configured to perform user authentication by comparing answer information that is generated by converting authentication information generated by converting basic information using biometric information for generation using biometric information for authentication with correct answer information.

(2)

The authentication device according to (1), in which the authentication unit determines whether or not a user whose biometric information for generation is read is consistent with a user whose biometric information for authentication is read on the basis of a similarity between the answer information and the correct answer information.

(3)

The authentication device according to (1) or (2), further including:

a reading unit configured to read the biometric information for authentication; and a conversion unit configured to convert the authentication information into the answer information using the biometric information for authentication.

(4)

The authentication device according to (3), further including:

an extraction unit configured to extract a feature amount of the biometric information for authentication, in which the conversion unit converts the authentication information into the answer information using the feature amount.

(5)

The authentication device according to (4), in which the extraction unit extracts a plurality of types of the feature amounts of the biometric information for authentication, and the conversion unit divides the authentication information into a plurality of portions and converts the authentication information into the answer information using the feature amount different for each of the portions.

(6)

The authentication device according to any one of (3) to (5), in which the biometric information for authentication and the biometric information for generation include a plurality of types of biometric information, and the conversion unit converts the authentication information into the answer information using the plurality of types of biometric information.

(7)

The authentication device according to any one of (3) to (6), in which the basic information is consistent with the correct answer information, and the conversion unit converts the authentication information into the answer information through inverse conversion that corresponds to the conversion from the basic information into the authentication information.

(8)

The authentication device according to any one of (3) to (6), in which the conversion from the basic information into the authentication information is irreversible conversion, and the basic information is different from the correct answer information.

(9)

The authentication device according to any one of (3) to (8), in which the conversion unit converts a plurality of pieces of the authentication information into a plurality of pieces of the answer information using the biometric information for authentication, and the authentication unit specifies the authentication information converted using the biometric information for generation read from the user whose biometric information for authentication is read, on the basis of a similarity between a plurality of pieces of the answer information and the correct answer information.

(10)

The authentication device according to any one of (1) to (9), in which the authentication information is generated using the biometric information for generation of a plurality of users, and the authentication unit determines whether or not the user whose biometric information for authentication is read is included in the plurality of users on the basis of the similarity between the answer information and the correct answer information.

(11)

The authentication device according to any one of (1) to (10), further including:
a communication unit configured to receive the answer information from another device and transmit information that indicates a result of user authentication by the authentication unit to the another device.

(12)

The authentication device according to any one of (1) to (11), in which
the biometric information for generation and the biometric information for authentication include at least any one of a finger vein, a fingerprint, a palm print, voice, a face, an iris, or ear sound.

(13)

An authentication method including:
performed by an authentication device,
performing user authentication by comparing answer information that is generated by converting authentication information generated by converting basic information using biometric information for generation using biometric information for authentication with correct answer information.

(14)

A program for causing a computer to execute processing including:
performing user authentication by comparing answer information that is generated by converting authentication information generated by converting basic information using biometric information for generation using biometric information for authentication with correct answer information.

(15)

An information processing device including:
a reading unit configured to read biometric information for generation; and
a conversion unit configured to convert basic information into authentication information using the biometric information for generation, in which
the authentication information is converted into answer information using biometric information for authentication, and user authentication is performed by comparing the answer information and correct answer information.

(16)

The information processing device according to (15), further including:
an extraction unit configured to extract a feature amount of the biometric information, in which
the conversion unit divides the authentication information into a plurality of portions and converts the authentication information using a feature amount of a type different for each of the portions.

(17)

The information processing device according to (15) or (16), in which
the biometric information for authentication and the biometric information for generation include a plurality of types of biometric information, and the conversion unit converts the basic information into the authentication information using the plurality of types of biometric information.

(18)

The information processing device according to any one of (15) to (17), in which
the conversion unit converts the basic information into the authentication information using the biometric information for generation of a plurality of users.

(19)

The information processing device according to any one of (15) to (18), in which
the reading unit further reads the biometric information for authentication, and
the conversion unit further converts the authentication information into the answer information using the biometric information for authentication, and
the information processing device further including:
a communication unit configured to transmit the answer information to an authentication device and receive information that indicates a result of user authentication performed by comparing the answer information with the correct answer information from the authentication device.

(20)

The information processing device according to any one of (15) to (19), in which
the conversion unit converts the basic information into the authentication information according to a conversion rule provided from outside.

REFERENCE SIGNS LIST

1 Authentication system
11 Authentication information issuing device
12 Authentication device
51 Biometric information reading unit
52 Biometric information feature amount extraction unit
53 Template conversion unit
54 Conversion rule storage unit
55 Basic template storage unit
56 Authentication template output unit
61 Biometric information reading unit
62 Biometric information feature amount extraction unit
63 Authentication template reading unit
64 Template conversion unit
65 Conversion rule storage unit
66 Authentication unit
67 Correct answer template storage unit
68 Authentication result display unit
81 Camera
82 Projector
101 Server
102 Mobile terminal
111, 121 Communication unit

The invention claimed is:
1. An authentication device, comprising:
a central processing unit (CPU) configured to:
determine a quality of first biometric information of a first user;
convert authentication information into answer information based on the determined quality of the first biometric information is equal to or greater than a threshold quality, wherein
the authentication information is generated based on a conversion of basic information, and
the basic information is converted into the authentication information based on second biometric information;

compare the answer information and correct answer information;
determine, based on a similarity between the answer information and the correct answer information, a consistency of the first user with a second user associated with the second biometric information; and
authenticate the first user based on the determined consistency and the comparison between the answer information and the correct answer information; and
control, based on the authentication of the first user, display of a result on a display screen, wherein the result indicates the authentication of the first user.

2. The authentication device according to claim 1, wherein the CPU is further configured to:
read the first biometric information; and
convert the authentication information into the answer information based on the first biometric information.

3. The authentication device according to claim 2, wherein the CPU is further configured to:
extract at least one feature amount of the first biometric information; and
convert the authentication information into the answer information based the extracted at least one feature amount.

4. The authentication device according to claim 3, wherein the CPU is further configured to:
extract a plurality of types of the at least one feature amount of the first biometric information;
divide the authentication information into a plurality of portions; and
convert, based on a first type associated with a first portion of the plurality of portions of the authentication information, the first portion into the answer information, wherein the first type is from the plurality of types of the at least one feature amount.

5. The authentication device according to claim 2, wherein
the first biometric information includes a plurality of first types of the first biometric information,
the second biometric information includes a plurality of second types of the second biometric information, and
the CPU is further configured to convert the authentication information into the answer information based on the plurality of first types of the first biometric information.

6. The authentication device according to claim 2, wherein
the basic information is consistent with the correct answer information,
the CPU is further configured to convert the authentication information into the answer information based on an inverse conversion process, and
the inverse conversion process corresponds to an inverse of the conversion of the basic information into the authentication information.

7. The authentication device according to claim 2, wherein
the conversion from the basic information into the authentication information is an irreversible conversion, and
the basic information is different from the correct answer information.

8. The authentication device according to claim 2, wherein the CPU is further configured to:
convert a plurality of pieces of the authentication information into a plurality of pieces of the answer information based on the first biometric information; and
specify a first piece of the authentication information from the plurality of pieces of the authentication information, based on the similarity between each of the plurality of pieces of the answer information and the correct answer information.

9. The authentication device according to claim 1, wherein
the authentication information is generated based on third biometric information of a plurality of users, and
the CPU is further configured to determine that the plurality of users includes the first user based on the similarity between the answer information and the correct answer information.

10. The authentication device according to claim 1, wherein the CPU is further configured to:
receive the answer information from a mobile terminal; and
transmit information, that indicates the result of the authentication of the first user, to the mobile terminal.

11. The authentication device according to claim 1, wherein
the first biometric information and the second biometric information include at least one of a finger vein, a fingerprint, a palm print, voice, a face, an iris, or ear sound.

12. An authentication method, comprising:
determining a quality of first biometric information of a first user;
converting authentication information into answer information based on the determined quality of the first biometric information is equal to or greater than a threshold quality, wherein
the authentication information is generated based on a conversion of basic information, and
the basic information is converted into the authentication information based on second biometric information;
comparing the answer information and correct answer information;
determining, based on a similarity between the answer information and the correct answer information, a consistency of the first user with a second user associated with the second biometric information; and
authenticating the first user based on the determined consistency and the comparison between the answer information and the correct answer information; and
controlling, based on the authentication of the first user, display of a result on a display screen, wherein the result indicates the authentication of the first user.

13. A non-transitory computer-readable medium having stored thereon, computer-executable instructions which, when executed by a computer, cause the computer to execute operations, the operations comprising:
determining a quality of first biometric information of a first user;
converting authentication information into answer information based on the determined quality of the first biometric information is equal to or greater than a threshold quality, wherein
the authentication information is generated based on a conversion of basic information, and
the basic information is converted into the authentication information based on second biometric information;
comparing the answer information with correct answer information;

determining, based on a similarity between the answer information and the correct answer information, a consistency of the first user with a second user associated with the second biometric information; and authenticating the first user based on the determined consistency and the comparison between the answer information and the correct answer information; and controlling, based on the authentication of the first user, display of a result on a display screen, wherein the result indicates the authentication of the first user.

14. An information processing device, comprising:
a central processing unit (CPU) configured to:
  read first biometric information of a first user;
  determine a quality of the first biometric information; and
  convert basic information into authentication information based on the determined quality of the first biometric information is equal to or greater than a threshold quality, wherein
    the authentication information is converted into answer information based on second biometric information,
    a consistency of the first user with a second user is determined based on a similarity between the answer information and correct answer information,
    the second user is associated with the second biometric information,
    a user authentication is based on the consistency and a comparison between the answer information and the correct answer information, and
    a result of the user authentication is displayed on a display screen.

15. The information processing device according to claim 14, wherein the CPU is further configured to:
  extract at least one feature amount of the second first biometric information;
  divide the authentication information into a plurality of portions; and
  convert, based on a first feature amount associated with a first portion of the plurality of portions of the authentication information, the first portion, wherein the at least one feature amount includes the first feature amount.

16. The information processing device according to claim 14, wherein
  the first biometric information includes a plurality of first types of the first biometric information,
  the second biometric information include a plurality of second types of the second biometric information, and
  the CPU is further configured to convert the basic information into the authentication information based on the plurality of first types of the first biometric information.

17. The information processing device according to claim 14, wherein
  the CPU is further configured to convert the basic information into the authentication information based on third biometric information of a plurality of users.

18. The information processing device according to claim 14, wherein the CPU is further configured to:
  read the second biometric information;
  convert the authentication information into the answer information based on the second biometric information;
  transmit the answer information to an authentication device; and
  receive information that indicates the result of the user authentication from the authentication device, wherein the result of the user authentication is based on the comparison between the answer information and the correct answer information.

19. The information processing device according to claim 14, wherein
  the CPU is further configured to convert the basic information into the authentication information based on a conversion rule.

* * * * *